United States Patent
Fukushima et al.

(10) Patent No.: US 11,155,936 B2
(45) Date of Patent: Oct. 26, 2021

(54) HIGHLY FUNCTIONAL POLYETHYLENE FIBER, AND DYED HIGHLY FUNCTIONAL POLYETHYLENE FIBER

(75) Inventors: Yasunori Fukushima, Shiga (JP); Shoji Oda, Shiga (JP); Akira Hamano, Shiga (JP); Minoru Masuda, Fukui (JP)

(73) Assignee: TOYOBO CO., LTD., Osaka (JP)

( * ) Notice: Subject to any disclaimer, the term of this patent is extended or adjusted under 35 U.S.C. 154(b) by 645 days.

(21) Appl. No.: 14/002,421

(22) PCT Filed: Sep. 14, 2011

(86) PCT No.: PCT/JP2011/071057
§ 371 (c)(1),
(2), (4) Date: Aug. 30, 2013

(87) PCT Pub. No.: WO2012/117596
PCT Pub. Date: Sep. 7, 2012

(65) Prior Publication Data
US 2014/0000007 A1    Jan. 2, 2014

(30) Foreign Application Priority Data

Mar. 3, 2011  (JP) .............................. JP2011-046207
May 19, 2011  (JP) .............................. JP2011-112136

(51) Int. Cl.
*D01F 6/04*    (2006.01)
*D01D 5/247*   (2006.01)
(Continued)

(52) U.S. Cl.
CPC ......... *D01F 6/04* (2013.01); *A41D 19/01505* (2013.01); *C08F 110/02* (2013.01);
(Continued)

(58) Field of Classification Search
USPC ................................................. 428/364–401
See application file for complete search history.

(56) References Cited

U.S. PATENT DOCUMENTS 3,166,885 A * 1/1965 Bridgeman ............ D02G 3/322
                                                    264/DIG. 77
3,832,436 A * 8/1974 Harris ....................... D01F 6/84
                                                       264/210.8
(Continued)

FOREIGN PATENT DOCUMENTS

CN    1448546    10/2003
EP    1445356    8/2004
(Continued)

OTHER PUBLICATIONS

Chiang, Joseph Shing. "Intrinsic viscosities of linear polyethylene." Masters Thesis. 1971. University of Missouri-Rolla, Department: Chemical and Biochemical Engineering. (Year: 1971).*
(Continued)

*Primary Examiner* — Marla D McConnell
*Assistant Examiner* — Kevin Worrell
(74) *Attorney, Agent, or Firm* — Fish & Richardson P.C.

(57) ABSTRACT

The present invention provides a highly functional polyethylene fiber exhibiting reduction of change in their physical properties in a wide range of temperatures for processing for products and in a wide range of temperatures for usage as products, thereby enabling improvement of dimensional stability. In addition, the present invention provides a highly functional polyethylene fiber exhibiting a high degree of dye exhaustion to be obtained in a simple dyeing operation, and excellent color fastness. The highly functional polyethylene fiber of the present invention is characterized in that an intrinsic viscosity [η] is higher than or equal to 0.8 dL/g, and not higher than 4.9 dL/g, ethylene is substantially contained as a repeating unit thereof, and a maximum thermal shrinkage stress is less than or equal to 0.4 cN/dtex in TMA (thermo-mechanical analysis), and a thermal shrinking percentage at 100° C. is less than or equal to 2.5%.

24 Claims, 1 Drawing Sheet

(51) Int. Cl.

| | | |
|---|---|---|
| *D02J 1/22* | (2006.01) | |
| *D04B 1/28* | (2006.01) | |
| *D02G 3/32* | (2006.01) | |
| *D02G 3/44* | (2006.01) | |
| *D03D 15/56* | (2021.01) | |
| *A41D 19/015* | (2006.01) | |
| *C08F 110/02* | (2006.01) | |
| *D06M 101/20* | (2006.01) | |
| *D06M 15/53* | (2006.01) | |
| *D06P 3/79* | (2006.01) | |
| *D06M 13/165* | (2006.01) | |
| *D01F 11/06* | (2006.01) | |
| *D06M 13/17* | (2006.01) | |
| *D04B 21/18* | (2006.01) | |

(52) U.S. Cl.
CPC ............ *D01D 5/247* (2013.01); *D01F 11/06* (2013.01); *D02G 3/32* (2013.01); *D02G 3/442* (2013.01); *D02J 1/224* (2013.01); *D03D 15/56* (2021.01); *D04B 1/28* (2013.01); *D04B 21/18* (2013.01); *D06M 13/165* (2013.01); *D06M 13/17* (2013.01); *D06M 15/53* (2013.01); *D06P 3/794* (2013.01); *D06M 2101/20* (2013.01); *D10B 2321/021* (2013.01); *Y10T 428/2967* (2015.01); *Y10T 442/3024* (2015.04); *Y10T 442/413* (2015.04)

(56) References Cited

U.S. PATENT DOCUMENTS

| | | | |
|---|---|---|---|
| 5,171,815 A * | 12/1992 | Magill | B29C 55/18 264/280 |
| 5,238,735 A * | 8/1993 | Nagou | B01D 69/141 210/500.23 |
| 5,480,712 A | 1/1996 | Takahashi et al. | |
| 6,448,359 B1 | 9/2002 | Kavesh | |
| 6,746,975 B2 | 6/2004 | Kavesh | |
| 6,899,950 B2 | 5/2005 | Sakamoto et al. | |
| 7,056,579 B2 | 6/2006 | Sakamoto et al. | |
| 7,141,301 B2 | 11/2006 | Sakamoto et al. | |
| 7,247,372 B2 | 7/2007 | Sakamoto et al. | |
| 7,736,564 B2 | 6/2010 | Sakamoto et al. | |
| 2003/0033655 A1 | 2/2003 | Kavesh | |
| 2004/0062926 A1 | 4/2004 | Sakamoto et al. | |
| 2005/0003182 A1 | 1/2005 | Sakamoto et al. | |
| 2005/0118418 A1 | 6/2005 | Sakamoto et al. | |
| 2005/0238875 A1 | 10/2005 | Sakamoto et al. | |
| 2007/0190321 A1 | 8/2007 | Sakamoto et al. | |
| 2010/0000031 A1* | 1/2010 | Sierakowski | C08F 290/06 8/552 |
| 2010/0178503 A1* | 7/2010 | Tam | C08L 23/06 428/372 |
| 2013/0029552 A1 | 1/2013 | Fukushima et al. | |

FOREIGN PATENT DOCUMENTS

| | | |
|---|---|---|
| EP | 1493851 | 1/2005 |
| JP | 1160790 | 3/1999 |
| JP | 2003-55833 | 2/2003 |
| JP | 2003-055834 | 2/2003 |
| JP | 2003-064525 | 3/2003 |
| JP | 2003-528994 | 9/2003 |
| JP | 3666635 | 4/2005 |
| JP | 3734077 | 10/2005 |
| JP | 2006169497 A * | 6/2006 |
| WO | 2003/085176 | 10/2003 |
| WO | 2011/102186 | 8/2011 |

OTHER PUBLICATIONS

Jen-Taut Yeh, Shui-Chuan Lin, Cheng-Wei Tu, Kuo-Huang Hsie, Feng-Chih Chang. "Investigation of the drawing mechanism of UHMWPE fibers." J Mater Sci (2008) 43:4892-4900. DOI 10.1007/s10853-008-2711-1. Published online: Jun. 3, 2008. (Year: 2008).*
Japanese Patent Office, International Search Report for International Patent Appln. No. PCT/JP2011/071057 (dated Nov. 29, 2011).
Extended European Search Report for EP Application No. 11859984.4 dated Aug. 7, 2014.
European Patent Office, Communication in European Application No. 11859984.4 (dated Jan. 11, 2016).
Intellectual Property India: The Patent Office; Examination Report mailed in corresponding Indian patent application No. 7447/CHENP/2013 with English translation (dated Sep. 25, 2018).
Notice of Hearing issued in Indian Patent Application No. 7447/CHENP/2013 (Jan. 8, 2021).

* cited by examiner

[FIG.1]
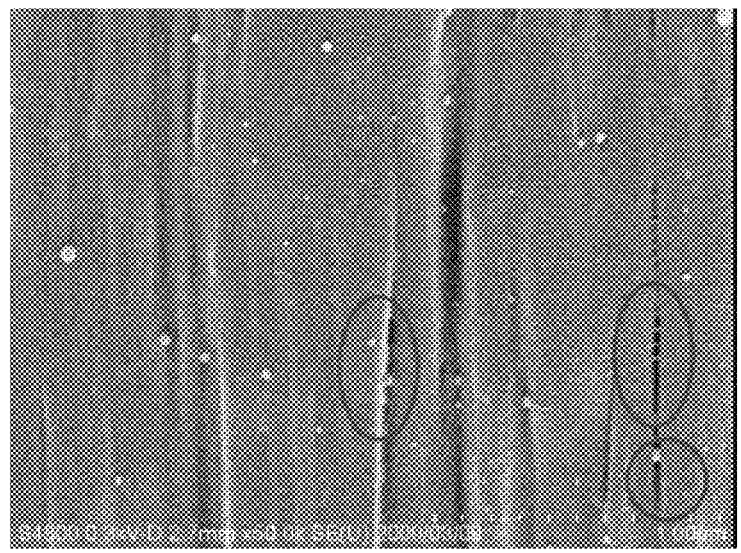
[FIG.2]
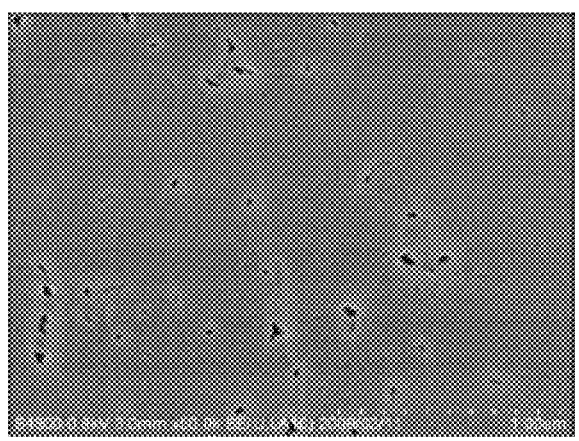

HIGHLY FUNCTIONAL POLYETHYLENE FIBER, AND DYED HIGHLY FUNCTIONAL POLYETHYLENE FIBER

TECHNICAL FIELD

The present invention relates to polyethylene fibers that exhibit reduction of change in their physical properties within a range from about room temperature to about a polyethylene crystal dispersion temperature, and that are excellent in dimensional stability, dyeability, and cut-resistance.

BACKGROUND ART

To date, high-strength fibers have been industrially used in a wide range of fields as: highly functional textiles such as various sportswear, bulletproof wear, protective wear, protective gloves, and various safety products; various rope products such as tag and mooring ropes, yacht ropes, and ropes for use in construction; various braided cord products such as fishing lines and blind cables; net products such as fishing nets and ball stop nets; reinforcing materials for chemical filters, battery separators, and various non-woven fabrics; materials for shelters such as tents; reinforcing fibers for use in composites such as prepregs for helmets and skis in sports, and prepregs for speaker cones; and the like.

Weather resistance and chemical resistance are among significant characteristics required in these applications. For example, a polyethylene fiber having a high modulus has been manufactured by a so-called gel spinning method using a solution in which an ultrahigh molecular weight polyethylene is dissolved in a solvent, and has been utilized (see, for example, Patent Literature 1). However, since an organic solvent is used for manufacturing the polyethylene fiber, a problem arises that a working environment may deteriorate when the polyethylene fiber is manufactured. Further, a problem arises that the solvent which remains in the polyethylene fiber obtained as products may cause an environmental load in indoor and outdoor applications even in a case where the amount of the residual solvent is slight.

As an invention for solving the aforementioned problems, a polyethylene fiber manufactured in a melt spinning method by using a high molecular weight polyethylene as a material has been suggested (see, for example, Patent Literatures 2 and 3). For the polyethylene fiber obtained in this method, a polyethylene used as a material has a molecular weight that is less than that for the polyethylene fiber obtained by the gel spinning method described above. Further, in this method, a fiber having a high elongation or a high thermal shrinking percentage is obtained, and it is presumed that this is caused by difference in manufacturing methods. A high-molecular component having such a characteristic exhibits an excellent performance in applications for which thermal shrinkage is to be positively performed. On the other hand, it is significant, as a characteristic, that a thermal shrinking percentage and a thermal shrinkage stress at about 100° C. are low in a post-processing (for example, processing, such as dyeing process, in boiling water) for which heating and warming are required. However, the polyethylene having a high thermal shrinking percentage is poor in dimensional stability, and a problem arises that products cannot be obtained as desired. Furthermore, particularly in applications, as fiber-reinforced plastics, concrete-reinforcing fibers, ropes, and the like, in which a tensile force is high and change of an ambient temperature is great in a used state, there has been a problem that physical properties and dimensions are likely to be changed, and performance as products cannot be maintained. In order to improve dimensional stability, for a polyethylene sheet, a residual stress generated in a component in the drawing process needs to be removed. In conventional arts, heat treatment is performed after the drawing process in general (see, for example, Patent Literature 4).

CITATION LIST

Patent Literature

Patent Literature 1: Japanese Patent No. 3666635
Patent Literature 2: Japanese Laid-Open Patent Publication No. 2003-55833
Patent Literature 3: Japanese Patent No. 3734077
Patent Literature 4: Japanese Laid-Open Patent Publication No. 11-60790

SUMMARY OF THE INVENTION

Problems to be Solved by the Invention

However, in the case of a polyethylene fiber, if excessive strain is applied in taking-up process after heat treatment, physical properties and dimensions are likely to be changed in environments in which the polyethylene crystal dispersion temperature is exceeded, or under a load applied when processing for products is performed or when finished products are used. Therefore, product processing conditions for obtaining a structure such as a rope, a net, a woven/knitted textile, or the like are limited. Further, there has been a problem that physical properties and dimensions are likely to be changed and performance as products cannot be maintained depending on usage environments. Furthermore, a polyethylene fiber that is manufactured by the conventional technique and has a high thermal shrinking percentage also has a problem that mechanical properties greatly change between before post-processing and after post-processing. Further, there has been a problem that mechanical properties are changed in the case of a product being used under a high temperature.

Further, it is necessary to impart various colors to the fiber depending on the application in general. In order to impart a color to the fiber, a method in which a coloring compound such as a pigment is blended during a spinning process, or a method in which filaments, woven/knitted textiles, and textile products are subjected to post-processing by using dyes, are known. However, in the former method, a problem arises that spinning operation efficiency is significantly deteriorated due to, for example, a spinning filter being clogged. On the other hand, in the latter method, a polyethylene is not excellent in dyeability and color fastness, so that a fiber having only a white-based color can be obtained. In Patent Literature 4, a method for forming a microporous polyethylene film is disclosed. In the method for forming a lot of micropores, a plasticizer is used, and the plasticizer is removed by using a solvent. However, according to the description, a lot of micropores are formed and used favorably for battery separators, membranes for electrolytic capacitors, various filters, moisture-permeable waterproof wear, and the like, that is, for application as separation films. Therefore, improvement of dyeability of the polyethylene fiber is neither disclosed nor suggested.

Thus, a highly functional polyethylene fiber that allows production processing conditions to be selected in a wide temperature range, and that exhibits reduction of change, in physical properties and dimensions, due to influence of usage environments after processing for products, has not been completed yet at present.

An object of the present invention is to solve the aforementioned problems of conventional arts. Specifically, an object of the present invention is to make available a highly functional polyethylene fiber that has high retention rates of mechanical properties not only in a temperature range in which processing for products is performed but also in a temperature range in which products are used, and that is excellent in dimensional stability. Another object of the present invention is to make available a highly functional polyethylene fiber that allows a high degree of dye exhaustion to be obtained in a simple dyeing operation, and that is excellent in color fastness. Thus, a highly functional polyethylene fiber is provided which can be used as various industrial materials for ropes, nets, woven/knitted textiles, and reinforcing fibers.

Still another object of the present invention is to make available a method for manufacturing the highly functional polyethylene fiber. In the method, a fiber is manufactured in a melt spinning method and drawing process for which a solvent is not used, in order to prevent manufacturing staff and environment from being adversely affected. Further, a tensile force in a heat treatment after the drawing process, and further a tensile force in a taking-up process after the heat treatment are accurately controlled.

Solution to the Problems

The inventors of the present invention have focused on and thoroughly studied conditions for heat treatment and taking-up process after drawing process, a thermo-mechanical analysis (TMA) and a thermal shrinking percentage of the polyethylene fiber, a viscoelasticity in a solid state, and a high-order structure of the polyethylene fiber, to achieve the present invention.

The first embodiment of the highly functional polyethylene fiber of the present invention is characterized in that an intrinsic viscosity [η] is higher than or equal to 0.8 dL/g, and not higher than 4.9 dL/g, ethylene is substantially contained as a repeating unit thereof, and a maximum thermal shrinkage stress is less than or equal to 0.4 cN/dtex in TMA (thermo-mechanical analysis), and a thermal shrinking percentage at 100° C. is less than or equal to 2.5%. In this embodiment, a thermal shrinkage stress at 50° C. is preferably less than or equal to 0.05 cN/dtex in TMA (thermo-mechanical analysis), and a thermal shrinkage stress at 80° C. is preferably less than or equal to 0.2 cN/dtex in TMA (thermo-mechanical analysis).

The second embodiment of the highly functional polyethylene fiber of the present invention is characterized in that an intrinsic viscosity [η] is higher than or equal to 0.8 dL/g, and not higher than 4.9 dL/g, ethylene is substantially contained as a repeating unit thereof, and a retention rate, at 105° C., of a storage modulus is such that a storage modulus at 105° C. is higher than or equal to 30% of a storage modulus at 30° C. In this embodiment, a retention rate, at 80° C., of a storage modulus is preferably such that a storage modulus at 80° C. is higher than or equal to 50% of a storage modulus at 30° C., and a retention rate, at 50° C., of a storage modulus is preferably such that a storage modulus at 50° C. is higher than or equal to 80% of a storage modulus at 30° C.

The third embodiment of the highly functional polyethylene fiber of the present invention is characterized in that an intrinsic viscosity [η] is higher than or equal to 0.8 dL/g, and not higher than 4.9 dL/g, ethylene is substantially contained as a repeating unit thereof, and a storage modulus obtained at intervals of 10° C. in a range from −50° C. to 60° C. is higher than or equal to 60% of a storage modulus at 20° C., and is not higher than 130% of the storage modulus at 20° C.

The fourth embodiment of the highly functional polyethylene fiber of the present invention is characterized in that an intrinsic viscosity [η] is higher than or equal to 0.8 dL/g, and not higher than 4.9 dL/g, ethylene is substantially contained as a repeating unit thereof, a ratio of monoclinic crystals in the fiber is higher than or equal to 0.5%, and not higher than 30%, and a ratio of orthorhombic crystals in the fiber is higher than or equal to 40%, and not higher than 90%. In this embodiment, the crystallinity for the fiber is preferably higher than or equal to 60%, and not higher than 95%.

In the highly functional polyethylene fiber of the present invention, it is preferable that a weight average molecular weight (Mw) of polyethylene ranges from 50,000 to 600,000, and a ratio (Mw/Mn) of the weight average molecular weight to a number average molecular weight (Mn) is less than or equal to 5.0. In addition, it is preferable that a tensile strength is higher than or equal to 8 cN/dtex, and an initial modulus is higher than or equal to 200 cN/dtex. Further, it is preferable that a concentration of a residual solvent in the fiber is less than or equal to 1000 ppm.

In the highly functional polyethylene fiber of the present invention, it is preferable that pores are formed from a surface of the fiber to an inside of the fiber, an average diameter for the pores ranges from 3 nm to 1 μm when the diameter is measured, by each pore being approximated by a column, at a contact angle of 140 degrees, in a mercury intrusion method, and the pores are formed such that a porosity ranges from 1.5% to 20%. In addition, it is preferable that the polyethylene fiber contains 0.005% to 10.0% by mass of an organic substance having an affinity for both a disperse dye and the polyethylene. Further, it is preferable that the organic substance having an affinity for both the disperse dye and the polyethylene contains at least one kind of polyether compounds each having a molecular weight greater than or equal to 500.

In the highly functional polyethylene fiber of the present invention, it is preferable that a degree of exhaustion is greater than or equal to 17%, and the degree of exhaustion is obtained when dyeing is performed at 100° C. at a bath ratio of 1:100 for 90 minutes by using a dye liquor that is prepared to have such a concentration as to contain 0.4 g/L of the disperse dye (Diaceliton fast Scarlet B (CI Disperse Red1)) and 1 g/L of a dyeing aid (Disper TL).

The present invention includes a method for manufacturing a highly functional polyethylene fiber, comprising performing melt-spinning of a polyethylene in which an intrinsic viscosity [η] is higher than or equal to 0.8 dL/g, and not higher than 4.9 dL/g, and ethylene is substantially contained as a repeating unit thereof, drawing the polyethylene at a temperature higher than or equal to a crystal dispersion temperature of the polyethylene, performing, after the drawing step, heat treatment, for a time period longer than or equal to 0.01 seconds, at a temperature higher than the crystal dispersion temperature by at least 10° C., and performing, after the heat treatment, taking-up at a tensile force less than or equal to 0.5 cN/dtex.

The highly functional polyethylene fiber of the present invention is characterized in that a dyed highly functional polyethylene fiber that is formed by the highly functional polyethylene fiber being dyed by using a disperse dye. It is preferable that, in the dyed highly functional polyethylene fiber, an evaluation value of a fastness to washing in compliance with JIS L-0844 Method A-1 or/and an evaluation value of a fastness to dry cleaning in compliance with JIS L-0860 Method A-1 is higher than or equal to grade 3.

The present invention is characterized in that a covered elastic yarn that is formed by an elastic fiber being covered by the highly functional polyethylene fiber or the dyed highly functional polyethylene fiber.

The present invention is characterized in that a protective woven/knitted textile that is woven/knitted by using, as at least a portion of the protective woven/knitted textile, the highly functional polyethylene fiber, the dyed highly functional polyethylene fiber, or the covered elastic yarn, wherein an Index value of a coup tester is greater than or equal to 2.5. Use of the protective woven/knitted textile is suitable for a cut-resistant glove.

Effects of the Invention

The highly functional polyethylene fiber of the present invention exhibits reduction of change in physical properties and excellent dimensional stability, in a wide range of temperatures for processing for products and in a wide range of temperatures for usage as products. The polyethylene fiber of the present invention exhibits a high degree of dye exhaustion to be achieved when a dyeing is performed at 100° C. by using an aqueous method, and excellent color fastness. Further, any color for dyeing can be optionally selected, thereby enabling various dyed products to be formed. Ropes, nets, woven/knitted textiles and the like prepared by the fiber of the present invention are exhibit excellent performance and design and are widely applicable as industrial materials.

BRIEF DESCRIPTION OF THE DRAWINGS

FIG. 1 is a SEM photograph magnified 50000 times for a surface of the highly functional polyethylene fiber of the present invention.

FIG. 2 is a SEM photograph of a cross-section of the highly functional polyethylene fiber of the present invention which is vertically cut in a direction orthogonal to a fiber axis. The magnification is 50000 times.

MODE FOR CARRYING OUT THE INVENTION

Hereinafter, the present invention will be described in detail.

In a highly functional polyethylene fiber of the present invention, an intrinsic viscosity is greater than or equal to 0.8 dL/g, preferably greater than or equal to 1.0 dL/g, and more preferably greater than or equal to 1.2 dL/g. An intrinsic viscosity is not greater than 4.9 dL/g, preferably not greater than 4.0 dL/g, and more preferably not greater than 2.5 dL/g. When the intrinsic viscosity of the highly functional polyethylene resin is not higher than 4.9 dL/g, filaments manufactured by a melt spinning method or split yarns from roll forming films is easily obtained, and it is unnecessary to produce the filaments by using a so-called gel spinning, or the like. Therefore, the melt spinning method gets an advantage over reduction of production cost, and simplification of working steps. Further, in the melt spinning method, since no solvent is used for producing the fiber, influence on manufacturing staff and environments is small. Moreover, in the case where products are prepared by the fibers, since there is no residual solvent in the fiber, users of products are not adversely affected by the solvent. On the other hand, when the intrinsic viscosity is greater than or equal to 0.8 dL/g, reduction of terminal groups of a polyethylene molecule leads to reduction of the number of structural defects in the fiber. Therefore, mechanical properties such as strength and modulus and cut resistance of the fiber can be improved. A concentration of a residual solvent in the fiber is preferably less than or equal to 1000 ppm, more preferably less than or equal to 500 ppm, and even preferably less than or equal to 200 ppm. The residual solvent includes hydrocarbon solvents such as decalin (decahydronaphthalene).

In the highly functional polyethylene fiber, a maximum shrinkage temperature in TMA (thermo-mechanical analysis) measurement is preferably higher than or equal to 105° C., more preferably higher than or equal to 110° C., and even preferably higher than or equal to 115° C. In addition, a maximum thermal shrinkage stress in TMA (thermo-mechanical analysis) measurement is preferably less than or equal to 0.4 cN/dtex, more preferably less than or equal to 0.35 cN/dtex, and even preferably less than or equal to 0.3 cN/dtex. The highly functional polyethylene fiber has a feature that difference of dimension stability in the range of from room temperature to crystal dispersion temperature is small, since a remaining deformation is small near room temperature. Therefore, a thermal shrinkage stress at 50° C. is preferably less than or equal to 0.05 cN/dtex, and more preferably less than or equal to 0.045 cN/dtex in the TMA measurement. A thermal shrinkage stress at 80° C. is preferably less than or equal to 0.2 cN/dtex, and more preferably less than or equal to 0.17 cN/dtex in the TMA measurement.

In addition, in the highly functional polyethylene fiber, a thermal shrinking percentage at 100° C. is preferably less than or equal to 2.5%, more preferably less than or equal to 2.3%, and even preferably less than or equal to 2.0%.

In the highly functional polyethylene fiber, a tensile strength is preferably greater than or equal to 8 cN/dtex. When the fiber has such a tensile strength, the fiber can be utilized to various applications which cannot be realized by general-purpose polyethylene fibers obtained by a conventionally melt spinning method.

The tensile strength is more preferably greater than or equal to 10 cN/dtex, and is even preferably greater than or equal to 11 cN/dtex. Although the upper limit of the strength need not be specified, the upper limit of tensile strength is preferably higher. It is difficult to obtain, by using a melt spinning method, a fiber having a tensile strength of greater than or equal to 55 cN/dtex, in terms of a technique and industrial manufacturing. Further, the highly functional polyethylene fiber of the present invention is likely to absorb energy of an edged tool, and show high cut resistance even when the tensile strength is less than 15 cN/dtex. Although the reason is not clear, it is assumed that this may be due to the existence the porous structure. Specifically, since the highly functional polyethylene fiber of the present invention includes the porous structure, elasticity is applied in the fiber cross-sectional direction that is a direction in which the edged tool progresses, so that an energy dispersion efficiency is enhanced. Therefore, when the tensile strength is greater than or equal to 8 cN/dtex, a required cut-resistance may be satisfactorily obtained.

In the highly functional polyethylene fiber of the present invention, an initial modulus is preferably greater than or equal to 200 N/dtex, and not greater than 750 cN/dtex. When the polyethylene fiber has such a modulus, change in physical property and shape from an external force applied to a completed product or during a product processing step is less likely to occur. The initial modulus is more preferably greater than or equal to 250 cN/dtex, even more preferably greater than or equal to 300 cN/dtex, and especially preferably greater than or equal to 350 cN/dtex. The initial modulus is more preferably not greater than 730 cN/dtex, and even preferably not greater than 710 cN/dtex. It is difficult to obtain a fiber having the initial modulus more than 750 cN/dtex, due to the frequent occurrence of napfluffs or filament breakages, in terms of industrial manufacturing. The measurement methods for the tensile strength and the initial modulus will be described in detail in examples.

The highly functional polyethylene fiber according to the present invention has preferably high retention rate of a storage modulus in the wide range of temperature. Specifically, a retention rate, at 105° C., of a storage modulus is such that a storage modulus at 105° C. is preferably at least higher than or equal to 30% of a storage modulus at 30° C., more preferably higher than or equal to 35% of a storage modulus at 30° C., and even preferably higher than or equal to 40% of a storage modulus at 30° C.

A retention rate, at 80° C., of a storage modulus is such that a storage modulus at 80° C. is preferably higher than or equal to 50% of a storage modulus at 30° C., more preferably higher than or equal to 55% of a storage modulus at 30° C., and even preferably higher than or equal to 60% of a storage modulus at 30° C.

A retention rate, at 50° C., of a storage modulus is such that a storage modulus at 50° C. is preferably higher than or equal to 80% of a storage modulus at 30° C., more preferably higher than or equal to 85% of a storage modulus at 30° C., and even preferably higher than or equal to 90% of a storage modulus at 30° C.

The fiber having the high retention rate of the storage modulus under dynamic load shows excellent rate of matter-nature keeping, since the fiber is less likely to be affected by the change of the environment under circumstances of 24 hours or more, high temperature such as 50° C., 80° C. and the like. The excellent rate of matter-nature keeping refers to a rate of changing within the range of 100±5%. In the post processing step in which hot water is used for the coloring of the fiber and the like, it is possible to control the lowering of dynamic physical properties after the post processing step.

It is preferable that the fluctuation of the storage modulus obtained at intervals of 10° C. in a range from −50° C. to 60° C. is small. Namely, it is preferable that a storage modulus obtained at intervals of 10° C. in a range from −50° C. to 60° C. is higher than or equal to 60% of a storage modulus at 20° C., and is not higher than 130% of a storage modulus at 20° C. It is more preferable that a storage modulus obtained at intervals of 10° C. in a range from −50° C. to 60° C. is higher than or equal to 65% of a storage modulus at 20° C., and is not higher than 125% of a storage modulus at 20° C. It is even preferable that a storage modulus obtained at intervals of 10° C. in a range from −50° C. to 60° C. is higher than or equal to 70% of a storage modulus at 20° C., and is not higher than 120% of a storage modulus at 20° C. The molded products having the high retention rate of the storage modulus under dynamic load shows excellent rate of matter-nature keeping of strength and modulus over long time, since the molded products is not likely to be affected by the change of the environment under circumstances from −50° C. to 60° C. Specifically, in the case where the molded products are continuously kept for 30 days under the circumstance of 60° C., the retention rate of the tensile strength and the modulus are preferably 65% to 130%, and more preferably 85% to 115%. Therefore, the fluctuation of the performance of the products according to the environment change can be small particularly in applications, as fiber-reinforced plastics, concrete-reinforcing fibers, ropes, and the like, in which a tensile force is high and change of an ambient temperature is great in a used state.

As the inside structure of the highly functional polyethylene fiber, a ratio of monoclinic crystals is preferably higher than or equal to 0.5% and not higher than 30%, more preferably higher than or equal to 1.0% and not higher than 28%, and even preferably higher than or equal to 2.0% and not higher than 25%. A ratio of orthorhombic crystals is preferably higher than or equal to 40% and not higher than 90%, more preferably higher than or equal to 45% and not higher than 85%, and even more preferably higher than or equal to 50% and not higher than 80%. Although the mechanism in relations between the inside structure of the fiber and the rate of matter-nature keeping is not clear, the component of monoclinic crystals is preferably contained in the inside structure in the small amount by controlling deformation from melting condition and solid condition, heat treatment condition, and winding tensile strength as set forth below. In the case where the component of monoclinic crystals is higher than 30%, it is likely to be difficult that the retention rate of the storage modulus is maintained in the range of higher than or equal to 60% and not higher than 130%. Although the reason is not clear, this is because the crystal structure of monoclinic crystals is unstable than that of orthorhombic crystals.

A ratio of monoclinic crystals and orthorhombic crystals can be determined by high resolution solid state $^{13}C$ NMR. Specifically, the ratio of the monoclinic crystals and the orthorhombic crystals are measured by "Avance400wb" (manufactured by Brukerbiospin) at room temperature. A magnetic field strength and a spin rate are 9.4 T and 4 kHz, respectively, in the measurement. A measurement pulse is according to Dipolar decoupling (DD)/MAS. A sample is cut so as to be strip-shaped, and is charged into a rotor. A DD/MAS spectrum is measured, by a single pulse method (DD/MAS method), with a waiting time being 4300 seconds, as a spectrum based on all components. Waveform is separated as monoclinic crystals, orthorhombic crystals, and amorphous components, from a low magnetic field side. A ratio thereamong is obtained according to an area ratio among areas of peaks of the monoclinic crystal, the orthorhombic crystal, and the amorphous component.

The crystallinity of the higher functional polyethylene fiber is preferably higher than or equal to 60%, and not higher than 95%, more preferably higher than or equal to 70%, and not higher than 90%, even preferably higher than or equal to 75%, and not higher than 88%. In the case where the crystallinity of the higher functional polyethylene fiber is less than 60%, not only the change rate of the storage modulus in −50° C. to 60° C. is large, also the physical properties of the fibers are lowered, thereby bringing into undesirable results. In the case where the crystallinity of the higher functional polyethylene fiber is over 95%, ductility is missed and texture is deteriorated when the fibers are processed in glove, and the like, thereby bringing into undesirable results.

A specific gravity of the highly functional polyethylene fiber is preferably greater than or equal to 0.880 g/cm$^3$, more preferably greater than or equal to 0.920 g/cm$^3$, and even preferably greater than or equal to 0.930 g/cm$^3$. In addition, a specific gravity of the highly functional polyethylene fiber is less than 1.0 g/cm$^3$ because the fiber is constituted from polyethylene. A specific gravity of the highly functional polyethylene fiber is preferably not greater than or equal to 0.999 g/cm$^3$, more preferably not greater than or equal to 0.995 g/cm$^3$, and even preferably not greater than or equal to 0.990 g/cm$^3$.

Preferably, the polyethylene used in the present invention substantially contains ethylene as a repeating unit. Further, in a range in which effects of the present invention can be obtained, not only an ethylene homopolymer but also a copolymer of ethylene and a small amount of another monomer such as α-olefins, acrylic acid and derivatives thereof, methacrylic acid and derivatives thereof, and vinyl silane and derivatives thereof can be used. The polyethylene may be the mixture of the copolymers, an ethylene homopolymer and another copolymer, a blend of an ethylene homopolymer and a homopolymer such as other α-olefins. The polyethylene may contain a partial crosslinked structure. In addition, the polyethylene may be a blend of polyethylenes having different weight average molecular weights as long as an intrinsic viscosity of the fiber meets the above-mentioned range. Further, the polyethylene may be a blend of polyethylenes having different molecular weight distributions (Mw/Mn) as long as an intrinsic viscosity of the fiber meets the above-mentioned range.

However, an excessive increase of a content of a copolymer component other than ethylene rather prevents drawing. Therefore, in light of obtaining a high strength fiber excellent in cut-resistance, a content of each of the other monomers such as an α-olefin is preferably less than or equal to 5.0 mol %, and is more preferably less than or equal to 1.0 mol %, and is even preferably less than or equal to 0.2 mol % as a monomer unit. Needless to say, the polyethylene may be an ethylene homopolymer.

The highly functional polyethylene fiber preferably has a weight average molecular weight of from 50,000 to 600,000, more preferably 70,000 to 300,000, and even preferably 90,000 to 200,000. In the case where the weight average molecular weight is less than 50,000, not only high draw ratio cannot be obtained in the drawing step as set forth below, also a tensile strength of the fiber obtained from a rapid cooling after drawing as set forth below does not meet greater than or equal to 8 cN/dtex. As to this, it is assumed that the number of a molecular terminal per cross section area increases due to small molecular weight of the polyethylene, thereby acting as structural defects. In addition, in the case where the weight average molecular weight is over 600,000, it is very difficult to discharge polyethylene from a nozzle in the melting spinning due to the very high melting viscosity.

A ratio (Mw/Mn) of the weight average molecular weight to a number average molecular weight is preferably less than or equal to 5.0. In the case where Mw/Mn is over 5.0, the tensile strength in the drawing step increases due to the inclusion of the high molecular weight component, and thread breakage happens in the drawing step, thereby bringing into undesirable results. The ratio (Mw/Mn) is preferably greater than or equal to 1.2, and is more preferably greater than or equal to 1.5, and even preferably greater than or equal to 1.8. The weight average molecular weight and the number average molecular weight each represent a value that is obtained by measurement being performed in a method described in examples.

The highly functional polyethylene fiber preferably has a feature that a porous structure is formed inside the fiber in addition to in the surface of the fiber. Thus, a space in which a dye is retained can be ensured inside the fiber. In general, when the porous structure is formed inside the fiber, the porous structure becomes a defect of the fiber, so that the dynamic physical properties are significantly deteriorated. However, in the present invention, the highly functional polyethylene fiber in which a dye applied to the fiber is less likely to be removed due to characteristics of the porous structure as described below, and, further, dyeability becomes excellent due to a molecular characteristic of the polyethylene in combination therewith, can be formed.

The highly functional polyethylene fiber has pores from the surface of the fiber to the inside thereof. Namely, pores are formed in the surface and the inside of the fiber (see FIGS. 1 to 2). FIG. 1 illustrates a 50000×SEM photograph of the surface of the highly functional polyethylene fiber of the present invention, and pores (black portion) are observed in an inside portion surrounded by an ellipse. In addition, FIG. 2 illustrates a SEM photograph of a cross-section of the highly functional polyethylene fiber of the present invention which is vertically cut in a direction orthogonal to a fiber axis. The magnification is 50000× in FIG. 2.

Although it is not clear from these cross-sectional photographs that the pores inside the fiber communicate with the surface thereof, it can be inferred from the following phenomenon, for example, that a lot of pores extend from the surface so as to communicate with the inside.

Namely, when a density of the highly functional polyethylene fiber of the present invention is measured by using a density gradient tube method, the density of the polyethylene fiber is increased over the passage of time. It can be assumed that this is because a solvent in a density gradient tube replaces air contained in the pores inside the fiber due to capillary phenomenon.

The highly functional polyethylene fiber preferably includes pores of which the average diameter ranges from 3 nm to 1 μm. Further, it is preferable that, when the fiber cross-section obtained by the highly functional polyethylene fiber being vertically cut in a direction orthogonal to the fiber axis is observed by using a scanning electron microscope (SEM) at 20000× magnification, the number of the pores of which the average diameter ranges from 3 nm to 1 μm is greater than or equal to 0.05 per 1 μm$^2$. The average diameter of the pore is preferably greater than or equal to 8 nm, and is preferably not greater than 500 nm, and is more preferably greater than or equal to 10 nm, and is more preferably not greater than 200 nm, and is even preferably greater than or equal to 15 nm, and is even preferably not greater than 150 nm.

In the case where the average diameter of the pore is not greater than 1 μm, when the highly functional polyethylene fiber having the pores is dyed, and is used for a product such as a glove, the removal of a dye can be restrained. Further, the reduction of the dynamic physical properties of the fiber can be restrained.

On the other hand, when the average diameter of the pore of the polyethylene fiber is controlled to be greater than or equal to 3 nm, permeation of the dye into the fiber is facilitated, thereby improving dyeability.

When the number of the pores is greater than or equal to 0.05 per 1 μm$^2$, the dyeability is improved, and a hue of the colored fiber becomes favorable. The number of the pores is more preferably greater than or equal to 0.1 per 1 μm$^2$, and is even preferably greater than or equal to 0.2 per 1 μm$^2$. The maximum number of the pores is not specified. However, when the number of the pores is excessively great, the drawing is likely to become difficult, and the dynamic physical properties of the fiber are likely to be reduced. The maximum number of the pores is determined according to an upper limit value of a porosity described below. Therefore, the maximum number of the pores is not restricted to any specific number when the porosity is within a range described below. When, for example, the average diameter of the pore is greater than or equal to 3 nm, and is less than 100 nm, the maximum number of the pores is preferably about 10000 per 1 μm², and is more preferably 8000 per 1 μm². When the average diameter of the pore is greater than or equal to 100 nm, the maximum number of the pores is preferably about 5000 per 1 μm², and is more preferably 1000 per 1 μm².

The number of the pores and the average diameter of the pore in the present invention can be obtained by using a mercury intrusion method and a nitrogen adsorption method in addition to the observation using a scanning electron microscope. In the observation using a scanning electron microscope, when a cross-section of the pore has an ellipsoidal shape or a polygonal shape, a distance between two points which are on the outer circumference of the pore, and which are furthest from each other is used as the diameter. Further, a shape of the pore of the highly functional polyethylene fiber according to the present invention exhibits anisotropy, and the pore may have a maximal diameter in a direction diagonal to the fiber axis in addition to a fiber axis direction or a direction orthogonal to the fiber axis direction.

A porosity of the highly functional polyethylene fiber is preferably greater than or equal to 1.5%, and is not greater than 20%, more preferably greater than or equal to 1.8%, and is not greater than 15%, and even preferably greater than or equal to 2.0%, and is not greater than 10%. The porosity represents a rate of a volume of the pores in the fiber. The porosity exerts great influence on the dyeability and the dynamic properties of the fiber. When the porosity is less than 1.5%, the dyeability is reduced, and a hue of a colored fiber is deteriorated. On the other hand, when the porosity is greater than 20%, the pores rather result in a defect of the structure due to increase of cavities, so that the dynamic properties are likely to be reduced.

The porosity of the present invention represents a rate (%) of a volume of the pores each of which has a diameter that is greater than or equal to 3 nm, and is not greater than 1 μm, inside the fiber, and the porosity is obtained by a mercury intrusion method. The average diameter of the pore is obtained by the pore being approximated by a column, and the porosity is calculated by using the following equation, on the condition that a mercury density is 13.5335 g/mL, and a contact angle is 140 degrees.

Porosity (%)=100×(volumetric capacity [mL] of pores each having a diameter ranging from 3 nm to 1 μm×mass [g] of sample)/(cell volumetric capacity−(mass [g] of mercury/(density [g/mL] of mercury))

The porosity can be also obtained by using a scanning electron microscope in addition to the mercury intrusion method.

The average diameter of the pore obtained by the mercury intrusion method is preferably greater than or equal to 3 nm, and is not greater than 1 μm, and more preferably greater than or equal to 8 nm, and is not greater than 500 nm, even preferably greater than or equal to 10 nm, and is not greater than 200 nm, and still even more preferably greater than or equal to 15 nm, and is not greater than 150 nm, similarly to the average diameter obtained through the observation using the scanning electron microscope.

Although the reason that the highly functional polyethylene fiber of the present invention forms the desirable fine pores is not clear, the following mechanism is presumed. Namely, the polyethylene is melt-extruded under the existence of the inert gas in the determined amount, and is subjected to the filter of mesh and the shear of orifice before discharge, thereby obtaining non-drawn filament having latent ununiformity in the fiber. The non-drawn filament is drawn by adding high deformation stress at the temperature not greater than crystal dispersion temperature, the space is formed inside the fiber due to manifestation of the difference of slightly deformational performance existing in the fiber, thereby forming very fine pores.

It is preferable that the highly functional polyethylene fiber has the pores inside the fiber and contains an organic substance having the affinity to both a disperse dye and the polyethylene. The organic substance exists inside the pores or the vicinity thereof.

A proportion of the organic substance to the highly functional polyethylene fiber is preferably greater than or equal to 0.005 mass %, and is preferably not greater than 10.0 mass %, more preferably greater than or equal to 0.05 mass %, and is more preferably not greater than 8.0 mass %, even preferably greater than or equal to 0.2 mass %, and is even preferably not greater than 5.0 mass %. When the content of the organic substance is greater than or equal to 0.005 mass %, a degree of dye exhaustion tends to be enhanced. On the other hand, when the content thereof is not greater than 10.0 mass %, the organic substance is restrained from acting as impurities in the fiber, thereby maintaining the properties of the fiber such as the dynamic properties. The content of the organic substance in the highly functional polyethylene fiber can be obtained by using an NMR method, which is adopted in examples, a gas chromatography method, or an infrared spectroscopy.

The organic substance may contain each of a component having an affinity for a disperse dye, and a component having an affinity for the polyethylene, and the organic substance may be either a mixture or a single compound. The organic substance may be, for example, a compound having an affinity for both a disperse dye and the polyethylene, or a mixture of a compound having an affinity for a disperse dye and a compound having an affinity for the polyethylene. These organic substances are preferably those having polarity.

The component having an affinity for a disperse dye may be an organic substance that can adsorb the disperse dye. Although the component having an affinity for a disperse dye is not limited to any specific organic substance as long as any organic substance enables this action, preferable examples thereof include disperse dye dispersants, surfactant substances, and polyester-based compounds and the like.

Examples of the disperse dye dispersant include polycyclic anionic surfactants such as naphthalene sulphonate formaldehyde condensates, Schaeffer's acid-cresol-formaldehyde condensates, and lignin sulfonic acids.

Examples of the surfactant substance include polyalkylene glycols such as polyethylene glycols, polypropylene glycols, and polybutylene glycols, and copolymers thereof, and surfactants such as polyvinyl alcohols, non-ionic surfactants, anionic surfactants, and cationic surfactants.

Examples of the surfactant include: an ester compound obtained by a reaction between a divalent fatty acid, and a compound in which a higher alcohol having 10 to 16 carbon atoms has ethylene oxide and propylene oxide added thereto; and polyether surfactants such as a higher alcohol alkylene oxide adduct having a molecular weight of 1000 to 3000, and a polyhydric alcohol alkylene oxide adduct.

Examples of the component having an affinity for the polyethylene include those capable of swelling polyethylene. Examples of the component having an affinity for the polyethylene include: paraffins; alkylene glycols such as ethylene glycol, polyethylene glycols, polypropylene glycols, and polybutylene glycols, which are polymerized with ethylene glycol; low molecular weight polyethylenes; polyethylene waxes; partially oxidized polyethylene waxes; and alkali metal salts of partially oxidized polyethylene waxes.

Further, examples of the component having a high affinity for both a disperse dye and the polyethylene include polyether compounds such as polyoxyethylenes, polyoxypropylenes, polyoxybutylenes, poly(oxyethylene-oxypropylene) random copolymers or block copolymers, and poly(oxyethylene-oxybutylene) random copolymers or block copolymers; alkylene glycols such as ethylene glycol, polyethylene glycols, polypropylene glycols, and polybutylene glycols, which are polymerized with ethylene glycol.

As the organic substance having a high affinity for a disperse dye and/or the polyethylene, one kind of the compounds described above as examples may be independently used, or two or more kinds of the compounds described above as examples may be used in combination. Specific examples of the polyether include polyoxyethylenes and polyoxybutylenes. The polyether preferably has a molecular weight of greater than or equal to 500, more preferably greater than or equal to 1,000, and even preferably greater than or equal to 2,000, preferably not greater than 100,000, more preferably not greater than 50,000, and even preferably not greater than 30,000. When the molecular weight thereof is greater than 100,000, a viscosity is increased, and it is difficult to perform application of the organic substance uniformly over the entirety of the fiber, which is unfavorable. As the organic substance according to the present invention, among the compounds described above as examples, an organic substance that contains at least one kind of the polyether compounds is preferably used.

The highly functional polyethylene fiber of the present invention which has the porous structure described above, has a high degree of exhaustion when the dyeing is performed by using the disperse dye. The dyed highly functional polyethylene fiber obtained by the dyeing being performed using the disperse dye has a deep color such as blue and/or black, and is practical and excellent in color fastness. Further, when the highly functional polyethylene fiber also has, inside or near the porous structure, the organic substance having a high affinity for both the disperse dye and the polyethylene as described above, the degree of exhaustion and the color fastness are further enhanced.

As a method for producing the highly functional polyethylene fiber according to the present invention, the following melt spinning method is preferably employed. For example, in the gel spinning method which is one of methods for producing an ultrahigh molecular weight polyethylene fiber by using a solvent, although a high strength polyethylene fiber can be obtained, not only productivity is low, but also use of the solvent exerts a great influence on health of manufacturing staff and environments and a solvent remaining in the fiber exerts a great influence on health of manufacturing staff.

When the highly functional polyethylene fiber according to the present invention is manufactured, the above-mentioned polyethylene is melt-extruded with extruder and the like, and supplied to a spinneret (spinning nozzle) with fixed quantity supplying machines, to discharge a melting polyethylene. The temperature of the melt extrusion is higher than the melting point of the polyethylene by preferably 10° C. or more (more preferably 50° C. or more, even preferably 80° C. or more). At this time, it is suggested that an inert gas is supplied to extruder. A pressure of the inert gas to be supplied is set to be preferably greater than or equal to 0.001 MPa, and be preferably not greater than 0.8 MPa, be more preferably greater than or equal to 0.05 MPa, and be more preferably not greater than 0.7 MPa, and be even preferably greater than or equal to 0.1 MPa, and be even preferably not greater than 0.5 MPa.

In general, in order to remove impurities contained in the melted resin, a filter is provided in a nozzle pack preceding the spinning nozzle (spinneret). In the present invention, a filter in which a diameter for a mesh is less than or equal to 100 μm, is preferably used. The diameter for the mesh is more preferably less than or equal to 50 μm, and is even preferably less than or equal to 15 μm. Further, a spinning nozzle is a nozzle diameter ranging from 0.3 mm to 2.5 mm, preferably 0.5 mm to 1.5 mm. When the melting resin is discharged from the spinning nozzle, the temperature of the nozzle is higher than the melting point of polyethylene by preferably 80° C. or more (more preferably 100° C. or more). The discharge rate is preferably higher or equal 0.1 g/min. A discharge linear velocity preferably ranges from 10 cm/min. to 120 cm/min, more preferably ranges from 20 cm/min. to 110 cm/min, and even preferably ranges from 30 cm/min. to 100 cm/min. Then, after cooling the discharged filaments to 5 to 40° C., cooled filaments are rolled at the speed of higher or equal to 100 m/min.

In addition, when the rate of matter-nature keeping and the dyeability of the highly functional polyethylene fiber are further enhanced, it is preferable that a mold method in melting state after the discharge is controlled. Specifically, it is preferable that discharged filaments are deformed at magnification of preferably higher or equal to 50 times (more preferably higher or equal to 100 times, even preferably higher or equal to 150 times) until the discharged filaments are rolled up. It is important that the time needed to deform is preferably within 3 minutes (more preferably within 2 minutes, even preferably within 1 minute). When the time needed to deform is over 3 minutes, the ratio of the monoclinic crystals and the orthorhombic crystals of the polyethylene fiber, and void structure inside the fiber cannot be obtained due to the occurrence of structure relaxation in the melting state.

Further, the obtained non-drawn filaments are drawn at the temperature of not greater than the melting point of the fiber in the number of at least one time or more. It is suggested that the drawing is performed in two or more times drawing steps. In the case of multiple drawing steps, it is preferable that the temperature of the drawing step is gradually higher in the latter drawing step. In the case of multiple drawing steps, the drawing temperature of the initial drawing (for example first drawing) is preferably less than crystal dispersion temperature of the polyethylene, specifically, more preferably not greater than equal to 80° C., and even preferably not greater than equal to 75° C. The drawing temperature of the last drawing step is preferably not less than crystal dispersion temperature of the polyethylene, and not greater than the melting point of the polyethylene, specifically, more preferably greater than or equal to 90° C. and less than the melting point of the polyethylene. In the case of one drawing step, the drawing temperature is preferably greater than or equal crystal dispersion temperature of the polyethylene, and not greater than the melting point of the polyethylene. The crystal dispersion temperature of the polyethylene uses a value obtained by a measurement method as set forth below.

A draw ratio is preferably greater than or equal to 6 times, is more preferably greater than or equal to 8 times, and is even more preferably greater than or equal to 10 times. The draw ratio is preferably not greater than 30 times, is more preferably not greater than 25 times, and is even preferably not greater than 20 times. In a case where the multiple times drawing steps are adopted, when, for example, two times drawing steps are performed, the draw ratio for the first drawing step preferably ranges from 1.05 to 4.00 times, and the draw ratio for the second drawing step preferably ranges from 2.5 to 15 times.

In addition, when the rate of matter-nature keeping and the dyeability of the highly functional polyethylene fiber are further enhanced, it is preferable that a mold method in solid state of a non-drawn mold is controlled. In this case, not only the number of drawing step and the drawing temperature are important, but also especially, it is preferable that the total drawing magnification in solid state is preferably higher or equal to 8 times (more preferably higher or equal to 9 times, even preferably higher or equal to 10 times). It is preferable that the time needed to deform in solid state is preferably within 5 minutes (more preferably within 4 minutes, even preferably within 3 minute). When the time needed to deform is over 5 minutes, the ratio of the monoclinic crystals and the orthorhombic crystals of the polyethylene fiber, and void structure inside the fiber cannot be obtained.

The reason that the time of deformation in the spinning and the drawing is important is presumed as follows. The ratio of the orthorhombic crystals and the monoclinic crystals can be controlled in the desirable range by shortening the time needed to deform. Although this detail mechanism is not clear, it is presumed that when the time of deformation is longer than 5 minutes in the drawing condition, the orthorhombic crystals having the stable crystal structure is undesirably affected by deform stress, so that the ratio of the orthorhombic crystals is decreased. It is possible that the change of the storage modulus in the wide range of the temperature as set forth below becomes small by increasing the ratio of the orthorhombic crystals, and the change of the dynamic properties is small in even use of long period of time under relatively high temperature. Incidentally, the time needed to deform may be short. However, since it is need that the specific temperature is provided with the fiber, the time needed to deform is preferably greater than or equal to 0.1 second, more preferably greater than or equal to 1 second, and even preferably greater than or equal to 10 seconds.

It is preferable that the specific ratio of the orthorhombic crystals and the monoclinic crystals exist in the crystal structure of the fibers. The fibers exhibit excellent cut resistance due to the existence of the constant ratio of the monoclinic crystals even when the strength of the fiber is not greater than 15 cN/dtex. This detail is not clear. However, it is presumed that when the constant amount of the monoclinic crystals exists in the fiber, compared with the case where the whole crystal structure of the fiber is the orthorhombic crystals which are stable structure, the crystal structure of the fibers serves as a cushion and the energy provided by an edged tool can be dispersed. However, when the ratio of the monoclinic crystals becomes large, the above-mentioned ratio of the orthorhombic crystals and the monoclinic crystals is preferable, since the stable dynamic properties to the temperature of the originally important element cannot be maintained. Further, the time needed to deform has the influence on the dyeability of the fibers of the feature of the present invention as set forth below. Specifically, when the time needed to deform is over 5 minutes, the number of the pores which exist in the fiber and give the dyeability is small.

In the present invention, a method for treating the drawn filament after the above-mentioned drawing step is also important. Specifically, the temperature of the heat treatment and the time thereof in the step for heat-treating a drawn mold after passing the above-mentioned drawing step, and the tensile strength for rolling and the temperature thereof in the step for rolling filament are important. The thermal shrinking percentage at 100° C. can be set to less than or equal to 2.5% by precisely controlling the condition of the heat treatment and the tensile strength for rolling.

The drawing mold is heat-treated at the temperature of higher than crystal dispersion temperature of the polyethylene by preferably 10° C. or more (more preferably 15° C. or more, even preferably 20° C. or more), for preferably longer than or equal to 0.01 second (more preferably longer than or equal to 0.05 second, even preferably longer than or equal to 0.1 second). The upper limit of the temperature of the heat treatment is the melting point of the polyethylene. In addition, the tensile strength applied to the highly functional polyethylene fiber during the heat treatment is preferably not greater than 5 cN/dtex, more preferably not greater than 2 cN/dtex, and even preferably not greater than 1 cN/dtex. When the heat treatment is carried out at the temperature which does not meet the temperature of higher than crystal dispersion temperature of polyethylene by 10° C. or more, or when the heat treatment is carried out at the time which does not meet 0.01 second even if the temperature meets the above-mentioned temperature, the residual tensile strength inside the fiber cannot be fully removed. A method for heat during heat treatment is not especially limited. For example, hot roller, radiation panel, steam jet, hot pin and the like which are a known method are recommended, and the method is not limited in these.

It is preferable that three elements of the temperature to be treated, the time to be treated, and the tensile strength to be treated are kept within the above-mentioned range in the heat treatment step. For example, when the time to be treated is shorter than the above-mentioned range, or the temperature to be treated is lower than the above-mentioned range, it is likely that the partial ratio of the monoclinic crystals in the obtained molded product becomes large and the fluctuation of the storage modulus from the temperature influence becomes large. In addition, for example, when the temperature to be treated is higher than the above-mentioned range, or the tensile strength during heat treatment is higher than the above-mentioned range, it is likely that the molded product during the heat treatment is easily broken or the dynamic properties of the molded product obtained is decreased, or the performance of cut resistance is lowered.

The tensile strength for winding is preferably not greater than 0.5 cN/dtex, more preferably not greater than 0.4 cN/dtex, and even preferably not greater than 0.3 cN/dtex.

When the tensile strength for winding exceeds 0.5 cN/dtex, the residual stress is excessively imparted inside the fiber. As a result, the thermal shrinking percentage at 100° C. undesirably exceeds 2.5%, and the thermal shrinkage stress in TMA (thermo-mechanical analysis) or the maximum thermal shrinkage stress undesirably exceeds 0.4 cN/dtex. The thermal shrinkage stress in the range from about room temperature to about crystal dispersion temperature of the polyethylene to be presumed as the used environment temperature of the product becomes high, the change of the dynamic properties and the dimension is caused by the environment change, and the limitation is caused such that the process condition of products and the used temperature range of the final products are restricted, thereby bringing into undesirable results.

The temperature at winding is lower than crystal dispersion temperature by preferably 5° C. or more (more preferably 10° C. or more, even preferably 20° C. or more). When the tensile strength is high than the above-mentioned range, or the temperature at winding is greater than or equal to crystal dispersion temperature, the residual stress is undesirably caused inside the obtained product, and the change of dimension and the fluctuation of the dynamic properties are undesirably caused after making into a product. In addition, the thermal shrinkage stress in the range from about room temperature to about crystal dispersion temperature of the polyethylene to be presumed as the used environment temperature of the product becomes high, the change of the dynamic properties and the fluctuation of the dimension is caused by the environment change, and the limitation is caused such that the process condition of products and the used temperature range of the final products are restricted, thereby bringing into undesirable.

In addition, in the highly functional polyethylene fiber of the present invention, it is preferable that the organic substance, as described above, having a high affinity for both the disperse dye and the polyethylene is applied to the non-drawn filaments. Applying the organic substance of the present invention prior to the drawing process step leads to a permeation of a portion of the organic substance inside the fiber before the drawing process step, and to the state that the organic substance is capable of easily permeating inside the fiber, so that the permeation of the organic substance into pores formed in the drawing process step, may be promoted.

The step for imparting the organic substance used in the present invention may be performed in any stage preceding the drawing process step. However, it is desirable that the process step of applying the organic substance is performed on the non-drawn filaments obtained after the raw resin material is discharged from the spinning nozzle. Further, after the organic substance is applied, the non-drawn filaments may be immediately transferred to the drawing process step, or the non-drawn filaments may be left as they are for a predetermined time period. If the organic substance is applied to the raw polyethylene resin material before the melt-extrusion process step, the organic substance is likely to be decomposed due to heat and shearing in the extrusion process step, and further the filter mesh may be clogged with the organic substance, so that the spinning productivity may be deteriorated.

A method for applying the organic substance is not limited to any specific method. For example, a method in which the non-drawn filaments are immersed in a liquid organic substance, or in an organic substance solution prepared by the organic substance being dispersed and dissolved in water or an organic solvent, or a method for applying or spraying the organic substance or the organic substance solution to the non-drawn filaments, may be used.

The dyed highly functional polyethylene fiber according to the present invention is obtained by dyeing the highly functional polyethylene fiber with a disperse dye. The highly functional polyethylene fiber preferably indicates a degree of exhaustion that is greater than or equal to 17% when the polyethylene fiber is dyed for 90 minutes at 100° C. (an oil at 115° C. is used as a heating source) at a bath ratio of 1:100 relative to a dye liquor prepared to have such a concentration as to contain 0.4 g/L of a disperse dye (Diaceliton fast Scarlet B (CI Disperse Red1)) and 1 g/L of a dyeing aid (Disper TL). The degree of exhaustion is more preferably greater than or equal to 20%, is even preferably greater than or equal to 22%, and is still more preferably greater than or equal to 30%. The degree of exhaustion is obtained by the measurement of absorbance of the dye liquor being measured before and after dyeing.

In a case where the highly functional polyethylene fiber is used as woven/knitted textile processed, it is desirable in market that a fastness to washing and a fastness to dry cleaning which is important in applying to human and the like satisfy the practical level. In the present invention, a fastness to washing (JIS L-0844 A-1) and a fastness to dry cleaning (JIS L-0860 Method A-1, perchloroethylene) are employed as an indication of a fastness to the dyeing.

When the highly functional polyethylene fiber is used, the dyed highly functional polyethylene fiber indicates a fastness to washing (JIS L-0844 A-1) which is higher than or equal to grade 3, or a fastness to dry-cleaning (JIS L-0860 Method A-1, perchloroethylene) which is higher than or equal to grade 3, even when the fiber is dyed, in a simple dyeing process step, at 100° C. for about 30 minutes by using a disperse dye. Further, when the dyed highly functional polyethylene is used, a dyed product having a color fastness equivalent to that of the dyed highly functional polyethylene fiber can be easily obtained.

A method for dyeing the highly functional polyethylene fiber is not limited to any specific method, and any conventionally known dyeing method can be adopted. As a dye, a disperse dye is preferably used. The disperse dye holds one or some of various chromophores. Specific examples of the disperse dye include azo dyes, anthraquinone dyes, quinophthalone dyes, naphthalimide dyes, naphthoquinone dyes, and nitro dyes.

Examples of a commercially available disperse dye include C.I. Disperse Yellow 3, C.I. Disperse Yellow 5, C.I. Disperse Yellow 64, C.I. Disperse Yellow 160, C.I. Disperse Yellow 211, C.I. Disperse Yellow 241, C.I. Disperse Orange 29, C.I. Disperse Orange 44, C.I. Disperse Orange 56, C.I. Disperse Red 60, C.I. Disperse Red 72, C.I. Disperse Red 82, C.I. Disperse Red 388, C.I. Disperse Blue 79, C.I. Disperse Blue 165, C.I. Disperse Blue 366, C.I. Disperse Blue 148, C.I. Disperse Violet 28, and C.I. Disperse Green 9.

Further, the disperse dye can be selected from an appropriate database (for example, "Color Index"). Details of the disperse dyes and other examples of the disperse dye are described at pages 134 to 158 of "Industrial Dyes", edited by Klaus Hunger, Wiley-VCH, Weinheim, 2003. Therefore, the selection may be performed with reference thereto. Further, two or more kinds of the disperse dyes may be used in combination.

In order to provide other functions, an additive such as an antioxidant, a PH adjuster, a surface tension depressant, a viscosity improver, a moisturizing agent, a deep-coloring agent, an antiseptic agent, an antimold, an antistatic agent, a sequestering agent, and a reduction inhibitor, in addition to the disperse dye, may be used. These additives may be used, when the dyeing is performed, together with the disperse dye, to be applied to the highly functional polyethylene fiber.

Although the reason that the dyed highly functional polyethylene fiber can be obtained is not clear, the present inventors infer the following mechanism. Namely, the pores presented inside the fiber and the organic substance having a high affinity for both a dispersion dye to be filled and the polyethylene fiber are existed in the fiber, and the dye is permeated into the inside of the fiber and fixed in the above-mentioned pore structure, so that the removal of the dye after making into a product can be decreased to the utmost limit.

An application of the highly functional polyethylene fiber and/or the dyed highly functional polyethylene fiber is not limited to any specific application. For example, the highly functional polyethylene fiber may be used as filaments. Alternatively, an elastic fiber may be used as a core yarn, and the polyethylene fiber of the present invention may be used as a sheath yarn, to obtain a covered elastic yarn. Further, woven/knitted textiles may be preferably produced by using the covered elastic yarn. When the covered elastic yarn of the present invention is used, the woven/knitted textile can provide enhanced wearing feeling, and facilitate putting-on and taking-off, and further light is absorbed and reflected by the pores (micro voids) formed in the surface and the inside of the highly functional polyethylene fiber used as the sheath yarn, thereby providing an effect that embrittlement of the elastic fiber (core yarn) can be restrained. Examples of the elastic fiber to be used as the core yarn of the covered elastic yarn include, but are not limited to, polyurethane fibers, polyolefin fibers, and polyester fibers. The elastic fiber described herein refers to a fiber representing a recovery property which is greater than or equal to 50% when elongated by 50%.

For a method for producing the covered elastic yarn, a covering machine may be used, or an elastic fiber and a non-elastic fiber may be assembled and twisted while the elastic fiber is being drafted. A rate at which the elastic fiber is mixed is preferably greater than or equal to 1 mass %, is more preferably greater than or equal to 5 mass %, and is even preferably greater than or equal to 10 mass %. When the rate at which the elastic fiber is mixed is low, a sufficient recovery from elongation and contraction cannot be obtained. However, when the rate is excessively high, strength is reduced. Therefore, the rate is preferably not greater than 50 mass %, and is more preferably not greater than 30 mass %.

A woven textile and knitted textile (woven/knitted textiles) in which the covered elastic yarn is used, is favorably used as protective woven/knitted textiles. The protective woven/knitted textile of the present invention preferably indicates an index value of a coup tester which is preferably greater than or equal to 2.5, more preferably greater than or equal to 2.8, even preferably greater than or equal to 3.0, even more preferably greater than or equal to 4.0, and especially preferably greater than or equal to 5.0 in light of cut-resistance and durability. Further, although an upper limit of the index value of the coup tester is not defined, the fiber may be thickened in order to increase the index value of the coup tester. However, in this case, texture characteristics tend to be deteriorated. Therefore, in light thereof, the upper limit of the index value of the coup tester is preferably not greater than 14, more preferably not greater than 12, and even preferably not greater than 10.

Further, it is assumed that the porous structure of the polyethylene fiber of the present invention exerts a great influence on results of evaluations of cut-resistance using the coup tester. Namely, it is assumed that the pores act as cushions, and energy is dispersed and/or absorbed in portions with which a blade of the coup tester contacts and in structures around the portions.

In the woven/knitted textile in which the covered elastic yarns of the present invention is used, a proportion of the covered elastic yarns of the present invention as described above, in the yarns constitutes the woven/knitted textile, is preferably greater than or equal to 30 mass %. Further, in the covered elastic yarn, a fineness per one filament is preferably greater than or equal to 1.5 dtex, and is preferably not greater than 220 dtex. Synthetic fibers such as polyester fibers, nylon fibers, and acrylic fibers, natural fibers such as cotton and wool, regenerated fibers such as rayon fibers, and/or the like may be contained such that a proportion of these other fibers is less than or equal to 70 mass % in the yarns constitutes the woven/knitted textile. In order to ensure abrasion-durability, polyester multifilaments or nylon filaments in which a fineness per one filament ranges from 1 dtex to 4 dtex can be preferably used. When these constituents are employed in addition to use of the polyethylene fiber and/or the covered elastic yarns of the present invention, an index value of a coup tester for the woven/knitted textile can be within the range described above.

A protective woven/knitted textile containing the covered elastic yarns according to the present invention can be favorably used as materials of cut-resistant gloves. The glove of the present invention can be knitted by a knitting machine with the use of the fiber and/or the covered elastic yarns of the present invention. Alternatively, the fiber and/or the covered elastic yarns of the present invention may be woven by a weaving machine into a fabric, and the glove may be sewn by the fabric being cut and joined.

A base cloth of the protective woven/knitted textile of the present invention contains the covered elastic yarns of the present invention as described above as a fiber component in light of the cut-resistance, a proportion of the covered elastic yarns in the base cloth is preferably greater than or equal to 30 mass %, is more preferably greater than or equal to 50 mass %, and is even preferably greater than or equal to 70 mass %. A fineness per one filament of the covered elastic yarn is preferably greater than or equal to 1.5 dtex, and is preferably not greater than 220 dtex, more preferably greater than or equal to 10 dtex, and more preferably not greater than 165 dtex, and even preferably greater than or equal to 20 dtex, and even preferably not greater than 110 dtex.

Synthetic fibers such as polyester fibers, nylon fibers, and acrylic fibers, natural fibers such as cotton and wool, regenerated fibers such as rayon fibers, and/or the like may be contained such that a proportion of these other fiber components is less than or equal to 70% by mass in the base cloth. In order to ensure abrasion-durability, polyester multifilaments or nylon filaments in which a fineness per one filament ranges from 1 dtex to 4 dtex are preferably used.

The woven/knitted textile having been thus obtained can be used as a glove as it is. However, a resin can be applied thereto in order to provide a non-slip characteristic as necessary. Examples of the resin used herein include, but are not limited to, urethane resins and ethylene resins.

The highly functional polyethylene fiber and/or the dyed highly functional polyethylene fiber are suitably used for tape, rope, safety rope, net, ball stop net, fishing net, fishing line, fastening line for meat, cover for protecting a material, sheet, line for kite, string for western style bow, seal cloth, shelter material.

In these usages, various hue or design is required according to a purpose together with the dynamic properties in some cases. Conventionally, post process for coating a resin containing an inorganic pigment or an organic pigment is often carried out (for example, JP 4041761). However, by using the dyed highly functional polyethylene fiber of the present invention, the fiber can be utilized in these usages without damaging the originally texture of the raw material The highly functional polyethylene fiber of the present invention having the small change of the dynamic properties in the wide range of the temperature and excellent dimensional stability is suitably used for reinforcing materials for use in fiber reinforced plastics which are required to heat in the latter processing step, cement-reinforcing materials, reinforcing materials for use in fiber reinforced rubbers, protective materials which are supposed for the environment change, bulletproof materials, sutures for medical use, artificial tendons, artificial muscles, machine tool components, battery separators, chemical filters.

Hereinafter, the present invention will be specifically described by means of examples. However, the present invention is not limited to examples described below. In examples, characteristic values of the polyethylene fiber obtained in the present invention were measured and evaluated as follows.

(1) Intrinsic Viscosity

Decalin at a temperature of 135° C. was used to obtain various diluted solutions, and specific viscosities of the diluted solutions were measured by using an Ubbelohde capillary viscometer. An intrinsic viscosity was determined based on extrapolated points to an originating point of a straight line obtained by least squares approximation of viscosities of the diluted solutions plotted against concentrations. When the measurement was performed, a sample was divided or cut into portions each having a length of about 5 mm, and 1% by mass of an antioxidant ("YOSHI-NOX (registered trademark) BHT", manufactured by Yoshitomi Pharmaceutical Co., Ltd.) relative to a polymer was added, and stirred and dissolved at 135° C. for four hours, to prepare measurement solutions.

(2) Weight Average Molecular Weight Mw, Number Average Molecular Weight Mn, and Mw/Mn.

The weight average molecular weight Mw, the number average molecular weight Mn, and the Mw/Mn were measured by the gel permeation chromatography (GPC). "GPC 150C ALC/GPC" (manufactured by Waters), was used as a GPC instrument, one "GPC UT802.5" column (manufactured by SHODEX) and two "UT806M" columns (manufactured by SHODEX) were used as columns, and a differential refractometer (RI detector) was used as a detector, to perform measurement. o-dichlorobenzene was used as a measurement solvent, and a column temperature was set to 145° C. A concentration of a sample was adjusted to 1.0 mg/ml, and 200 microliter of the sample solution was injected, to perform measurement. A molecular weight calibration curve was obtained, by a universal calibration method, by using a sample of a polystyrene of which the molecular weight was known.

(3) Tensile Strength, Elongation at Break, and Initial Modulus.

A strain-stress curve was obtained, under the condition that a length of a sample was 200 mm (a length between chucks), and an elongation rate was 100%/min., an ambient temperature was 20° C., and a relative humidity was 65%, by using a universal tester ("TENSILON Universal Material Testing Instrument" manufactured by ORIENTEC Co., LTD.). A strength (cN/dtex) and an elongation (%) were calculated based on a stress and an elongation at breaking point, and a modulus (cN/dtex) was calculated from the tangent line providing a maximum gradient on the curve in the vicinity of the originating point. At this time, an initial load applied to the sample at the measurement was one tenth of a weight (g), per 10000 m, of the fiber. An average of values obtained in ten measurements was used for each case.

(4) Measurement of Thermal Shrinking Percentage

Fiber samples to be measured were each cut into a size of 70 cm, and positions distant from both ends, respectively, by 10 cm, were marked so as to show that a length of each sample was 50 cm. Next, the fiber samples were hung on a jig so as to prevent a load from being applied thereto, and the fiber samples in this hanging state were heated at a temperature of 100° C. in a hot air circulating type heating oven for 30 minutes. Thereafter, the fiber samples were taken out of the heating oven, and gradually cooled down sufficiently to room temperature. Thereafter, a length between the positions which had been marked on each fiber sample at the beginning, was measured. The thermal shrinking percentage was obtained by using the following equation. An average of values obtained in two measurements was used for each case.

$$\text{Thermal shrinking percentage (\%)}=100\times(\text{length of unheated fiber sample}-\text{length of heated fiber sample})/(\text{length of unheated fiber sample})$$

(5) The Number of Pores on Cross-Section of Fiber

A sample of the cross-section of the fiber was produced in the following procedure.

The sample embedded in an acrylic resin ("SAMPL-KWICK (registered trademark) 473", manufactured by BUEHLER) was vertically cut in a direction orthogonal to the fiber axis at an acceleration voltage of 5 kV by using a cross section sample preparation device ("Cross Section Polisher (registered trademark)" manufactured by JEOL Ltd).

The cross section of the sample was observed at an acceleration voltage of 0.5 kV by using a scanning electron microscope ("S4800", manufactured by Hitachi High-Technologies Corporation), and a photograph thereof was taken at 20,000× magnification. Subsequently, the pores that were in any 1 μm² cross-section of the fiber and that had diameters ranging from 3 nm to 1 μm were visually counted. This measurement was performed five times at different portions, and an average value was used. When the pore was not circular, a maximal dimension was used as the diameter of the pore.

(6) Pore Average Diameter and Porosity

Preprocessing was performed such that a sample was subjected to vacuum-deaeration at room temperature for 24 hours. Next, 0.08 g of the sample was put into a vessel having a cell volumetric capacity of 6 mL, and a distribution of pores having pore radiuses ranging from about 0.0018 μm to 100 μm was measured by using an automated porosimeter ("AutoPore (registered trademark) III 9420", manufactured by MICROMERITICS). A value obtained by a mercury permeating volume being differentiated with respect to the diameter of each pore was able to be obtained for 1 g of the sample by this measurement. At this time, the pore was approximated by a column, a contact angle was 140 degrees, a surface tension of mercury was 480 mN/m (480 dynes/cm), and a density of mercury was 13.5335 g/mL. The porosity was calculated by using the following equation.

$$\text{Porosity (\%)}=100\times(\text{volumetric capacity [mL] of pores having diameters ranging from 3 nm to 1 μm}\times\text{mass [g] of sample})/(\text{cell volumetric capacity}-(\text{mass [g] of mercury}/(\text{density [g/mL] of mercury})))$$

(7) Degree of Exhaustion 1 g of a sample was put into a refining liquid (an amount of the liquid was 50 times relative to the amount of the sample, 2 g/L of "NOIGEN" (registered trademark) HC (manufactured by Dai-ichi Kogyo Seiyaku Co., Ltd.)) at 70° C., and was refined for 20 minutes. Next, the sample was washed with water, dewatered, and dried.

A disperse dye (Diacelliton fast Scarlet B (CI Disperse Red1)) and a dyeing aid (Disper TL) were dissolved in ion-exchanged water at such a concentration that 0.4000 g of the disperse dye was included in 1 L of the ion-exchanged water, and 1 g of the dyeing aid was included in 1 L of the ion-exchanged water, to prepare a dye liquor. 100 mL of the dye liquor and 1 g of the refined sample were put into a conical flask, and the dye liquor was shaken for 90 minutes while being heated in an oil bath set to 115° C. The number of the shaking was 110 times per minute.

Thereafter, the temperature of the residual liquid of the dye liquor was returned to room temperature, 5 mL of the residual liquid and 5 mL of acetone were put into a measuring flask and mixed, and acetone/water (1/1) was further added thereto so as to obtain the total amount of 100 ml (a). Similarly, 5 ml of the dye liquor which had not been used for dyeing, and 5 mL of acetone were put into a measuring flask and mixed, and acetone/water (1/1) was further added thereto so as to obtain the total amount of 100 ml (b).

Next, absorbances of the residual liquid (a) and the unused dye liquor (b) for a wavelength ranging from 350 nm to 700 nm were measured by using an ultraviolet spectrophotometer ("double beam spectrophotometer Type 150-20", manufactured by Hitachi, Ltd.), and the maximal values thereof were used as an absorbance a of the residual liquid and an absorbance b of the unused dye liquor, respectively. A degree of exhaustion (DY %) was calculated by using the obtained absorbances according to the following equation.

DY (%)=(1−(absorbance a of the residual liquid)/(absorbance b of the unused dye liquor))×100

(8) Quantitative Measurement of Organic Substance Having High Affinity for Disperse Dye and Polyethylene The organic substance was identified by using, for example, a gas chromatography-mass spectrometer or an H-NMR measurement.

Next, the organic substance was quantitatively measured by the following method.

The sample was immersed in acetone/hexane (=5/5) mixture at room temperature for 2 minutes, and washed. This was repeated three times, and thereafter about 10 mg of the sample was dissolved, at 135° C., in 0.6 mL of orthodichlorobenzene/$C_6D_6$ (=8/2). Next, the H-NMR (spectrometer; "AVANCE 500" manufactured by Bruker BioSpin, magnet; manufactured by Oxford Instruments) was used to perform measurement.

The measurement condition was set such that 1H resonance frequency: 500.1 MHz, a flip angle of detection pulse: 45 degrees, a data sampling interval: 4.0 seconds, delay time: 1.0 second, the number of times for integration: 64 times, and measurement temperature: 110° C. were satisfied. The "TOPSPIN (registered trademark) ver. 2.1" (manufactured by Bruker BioSpin K.K.) was used as a measurement and analysis program. Further, the sample was dissolved in heavy water, or a dried residue was dissolved in $CDCl_3$, and the H-NMR measurement was made to perform quantitative evaluation of the organic substance. The calculation method was used in which a value of integral of a peak based on 0.8 to 1.5 ppm of the polyethylene was represented as A, and a value of integral of a peak based on the organic substance was represented as B, and a proportion (X % by mass) of the organic substance was calculated as % by mol according to B/A.

The value as % by mol was converted by using a monomer-based molecular weight ratio, to calculate the proportion (X % by mass) of the organic substance. For example, when the organic substance was a polypropylene glycol/polyethylene glycol (=90/10; mass ratio, monomer-based molecular weight ratio; 1.95) mixture, the proportion of the organic substance was calculated by using the following equation.

X=(B/A)×1.95

(9) Thermo-Mechanical Analysis (TMA)

A thermal stress strain measurement apparatus ("TMA/SS120C", manufactured by Seiko Instruments Inc.) was used for the measurement. An initial load of 0.01764 cN/dtex was applied to a fiber sample having a length of 20 mm, and a temperature was increased at a temperature rising rate of 20° C./min., to measure a maximum shrinkage temperature, a maximum thermal shrinkage stress, and thermal shrinkage stresses at 50° C. and 80° C.

(10) Storage Modulus

Retention rate of storage modulus at 105° C., 80° C., and 50° C. (Production examples 1 to 16)

A solid viscoelasticity measurement apparatus ("DMA Q800", manufactured by T. A. Instruments) was used for the measurement. The measurement conditions were such that a length of a measurement sample was 10 mm, and a fineness of the sample was 100 dtex. In the measurement, in order to prevent slipping between the fiber sample and chucks of the apparatus and separation of monofilaments, both ends of the fiber sample was each sandwiched by a cardboard by using an adhesive and a double-faced tape. Thus, the cardboards were placed between the fiber sample and the chucks of the apparatus in the measurement, thereby enabling reduction of slipping at the chucks of the apparatus and separation of monofilaments. The measurement start temperature was −10° C., the measurement end temperature was 140° C., and a temperature rising rate was 1.0° C./min. A strain was 0.04%, and an initial load at the start of the measurement was 0.05 cN/dtex. Further, a measurement frequency was 11 Hz. "T. A. Universal Analysis" (manufactured by T. A. Instruments) was used for data analysis. At that time, a retention rate was calculated according to the following equation.

Retention rate (%) of storage modulus at each of 105° C., 80° C., and 50° C.=100×[(storage modulus at each of temperatures of 105° C., 80° C., and 50° C.)/(storage modulus at 30° C.)]

Retention rate of storage modulus in a range from −50° C. to 60° C. relative to storage modulus at 20° C. (Production examples 17 to 31)

A solid viscoelasticity measurement apparatus ("DMA Q800", manufactured by T. A. Instruments) was used for the measurement. The measurement conditions were such that a length of a measurement sample was 10 mm, and a fineness of the sample was adjusted to about 100 dtex for use. In the measurement, in order to prevent slipping between the fiber sample and chucks of the apparatus and separation of monofilaments, both ends of the measurement sample was each sandwiched by a cardboard by using an adhesive and a double-faced tape. Thus, the cardboards were placed between the measurement sample and the chucks of the apparatus in the measurement, thereby enabling reduction of slipping at the chucks of the apparatus and separation of monofilaments in the case of a fiber. The measurement start temperature was −140° C., the measurement end temperature was 140° C., and a temperature rising rate was 1.0° C./min. A strain was 0.04%, and an initial load at the start of the measurement was 0.05 cN/dtex. Further, a measurement frequency was 11 Hz. "T. A. Universal Analysis" (manufactured by T. A. Instruments) was used for data analysis. Retention rates were obtained according to the following equation. A value, among the values of the storage rates at the respective temperatures, which changed most greatly from the storage modulus at 20° C., was determined as a maximum change amount.

Retention rate (%) of storage modulus in a range from −50° C. to 60° C. relative to storage modulus at 20° C.=100×[(storage modulus at each of temperatures obtained at intervals of 10° C. in the range from −50° C. to 60° C.)/(storage modulus at 20° C.)]

(11) Crystal Dispersion Temperature

A solid viscoelasticity measurement apparatus ("DMA Q800", manufactured by T. A. Instruments) was used for the measurement in production examples 1 to 16. The measurement was made in a temperature range from −150° C. to 140° C., with a temperature rising rate of about 1.0° C./min. A loss modulus was calculated from a value obtained at the measurement frequency of 11 Hz, and a temperature dispersion was obtained from a low temperature side. Values of the loss modulus represented as logarithms by the vertical axis were plotted against the temperatures represented by the horizontal axis, and a peak value of absorption on the highest temperature side was determined as a crystal dispersion temperature.

In production examples 17 to 31, a solid viscoelasticity measurement apparatus ("DMA Q800", manufactured by T. A. Instruments) was used for the measurement, and "T. A. Universal Analysis" (manufactured by T. A. Instruments) was used for data analysis. The measurement was made in a temperature range from −140° C. to 140° C., with a temperature rising rate of about 1.0° C./min. A strain was 0.04%, and an initial load at the start of the measurement was 0.05 cN/dtex. A loss modulus was calculated from a value obtained at the measurement frequency of 11 Hz, and a temperature dispersion was obtained from a low temperature side. Values of the loss modulus represented as logarithms by the vertical axis were plotted against the temperatures represented by the horizontal axis, and a peak value on the highest temperature side was determined as a crystal dispersion temperature.

(12) Evaluation for Retention Rate of Physical Properties

In production examples 1 to 16, a fiber sample was processed in an oven heated to a temperature of 60° C. for 24 hours, and then cooled all night and all day, and a strength, an elongation, and a modulus as described above were measured. A retention rate of physical properties was calculated according to the following equation.

Retention rate (%) of physical properties=100×(mechanical properties after processing at 60° C. for 24 hours/mechanical properties before processing)

In production examples 17 to 31, a fiber sample was processed in an oven heated to a temperature of 60° C. for 30 days, and then cooled in a room at a temperature of 20° C. for 24 hours or longer, and a strength, an elongation, and a modulus as described above were measured. A retention rate of physical properties was calculated according to the following equation.

Retention rate (%) of physical properties after processing at 60° C. for 30 days=100×(mechanical properties after processing at 60° C. for 30 days/mechanical properties before processing)

(13) Concentration of Residual Solvent

A concentration of a residual solvent in a fiber sample was measured by using a gas chromatography (manufactured by SHIMADZU CORPORATION). 10 mg of a sample fiber was set in a glass insert in a gas chromatography injector. The injector was heated to a temperature higher than or equal to a boiling point of the solvent, and the solvent vaporized due to the heating was introduced into a column by nitrogen purge. A temperature of the column was set to 40° C., and the solvent was trapped for five minutes. Next, a temperature of the column was increased to 80° C., and the measurement was then started. A concentration of the residual solvent was obtained from an obtained peak.

(14) Cut-Resistance

Cut-resistance was evaluated by using a cut tester ("coup tester", manufactured by SODMAT).

An aluminum foil was provided on a sample base of the tester, and a sample was put on the aluminum foil. Next, a circular blade provided on the tester was caused to travel on the sample while the circular blade was being simultaneously rotated in a direction opposite to the traveling direction. When the sample had been cut, the circular blade and the aluminum foil contacted each other, so that an electric current flows, and it was determined that the cut resistance test had been ended. While the circular blade was operating, a counter mounted to the tester counted numerical values in accordance with the number of revolutions of the circular blade, and the numerical values were recorded.

In the test, a plain-woven cotton fabric having a weight per unit area of about 200 g/m² was used as a blank, and a cut level of the test sample (gloves) was evaluated. The test was started with the blank, and the test of the blank and the test of the test sample were alternately performed, and the test sample was tested five times, and the test was ended with the sixth test of the blank, thereby completing one set of tests. Five sets of the tests were performed, and an average Index value obtained from the five sets of the tests was calculated as a substitute evaluation value for the cut resistance. It is considered that the higher the Index value is, the more excellent the cut resistance is. A cutter used for this evaluation was an L-type rotary cutter (manufactured by OLFA CORPORATION) having φ45 mm. The material thereof was an SKS-7 tungsten steel, and a thickness of the blade was 0.3 mm. An applied load in the test was 3.14 N (320 gf). Thus, an evaluation was made.

The evaluation value calculated as described above was referred to as an Index, and the Index was calculated by using the following equation.

$A$=(a counted value for the cotton fabric obtained before the sample test+a counted value for the cotton fabric obtained after the sample test)/2

Index value=(a counted value for the sample+$A$)/$A$

(15) Dyeing Method

Various fibers to be evaluated were used to obtain knitted fabrics, and the knitted fabrics were refined, dyed, subjected to reduction-cleaning, and dried, to obtain dyed knitted fabrics. Thus, color fastness thereof was evaluated.

The knitted fabric for the evaluation was plain-stitch fabric that had a density satisfying C/W=19/30, and that was obtained by using a knitting machine of a single knit type of φ30 in×18 gauges.

(Dyeing Method)

A condition for refinement was set such that 1 g/L of "NOIGEN (registered trademark) HC (manufactured by Dai-ichi Kogyo Seiyaku Co., Ltd.)" was used to perform stirring at 60° C. at a bath ratio of 1:30, for ten minutes, and washing with hot water at 60° C., dewatering, and air-drying were performed.

The dyeing was performed in the following method.

(i) Used Dye

"Dianix (registered trademark) Black GS-E" (manufactured by DyStar Japan Ltd.) was used as a black dye, and "Sumikaron (registered trademark) Blue S-BG 200%" (manufactured by Sumitomo Chemical Company, Limited) was used as a blue dye.

(ii) Condition for Dyeing

For black color, the black dye was dispersed in water to prepare a dye liquor such that a concentration of the black dye was 6% owf, and a bath ratio was 1:10. For blue color, the blue dye was dispersed in water to prepare a dye liquor such that a concentration of the blue dye was 2% owf, and a bath ratio was 1:10. Subsequently, the knitted fabrics for evaluation were immersed in the dye liquors, and the temperature was increased at a rate of 2° C./min., and maintained at 100° C. for 30 minutes, and then water-cooling to normal temperature was performed, and the fabrics were washed with hot water at 60° C., and repeatedly washed and dewatered until discharged water remained uncolored.

(iii) Reduction Cleaning

In order to wash away excess dye attached to the knitted fabrics for evaluation, the knitted fabrics were subjected to reduction-cleaning in 0.8 g/L of "Tec Light" (manufactured by ADEKA), and 0.5 g/L of sodium hydroxide, at 80° C., for 10 minutes. The knitted fabrics were then washed with hot water at 60° C., then dewatered, and air-dried.

(16) Fastness Evaluation Method (i) Fastness to Washing

Evaluation was made in compliance with JIS L-0844 A-1 (stain in washing). At this time, hang-drying was performed.

(ii) Fastness to Rubbing

A drying test and a wetting test were performed by using a friction test machine Type II in compliance with JIS L-0849.

(iii) Fastness to Perspiration

A test was performed by using an artificial acidic perspiration solution and an artificial alkaline perspiration solution in compliance with JIS-L-0846.

(iv) Fastness to Dry Cleaning

Evaluation was made by using perchloroethylene in compliance with JIS L-0860 Method A-1. Further, evaluation on stain in cleaning was made by using petroleum substance in compliance with JIS L-0860 Method B-1.

(17) Specific Gravity

A specific gravity of the fiber was measured by using a density gradient tube method.

(Production of Density Gradient Tube)

Water was used as a heavy liquid, and isopropyl alcohol was used as a light liquid. While the light liquid was continuously and gradually mixed with the heavy liquid, they were poured into a glass tube having scale marks. The heavy liquid was in the bottom portion of the glass tube, and a proportion of the light liquid was increased toward the upper portion of the glass tube. Thus, a density gradient tube was produced. The density gradient tube was put into a constant temperature oven having a temperature of 30° C.±0.1° C.

Next, five or more glass balls (having specific gravities different from each other) of which the specific gravities were known were carefully put into the density gradient tube having been produced, and they were left stationary as they were for one day. Thereafter, a distance between each glass ball and the liquid level was measured, and a graph (a calibration curve) in which the obtained distances were represented by the vertical axis, and values of the specific gravities of the glass balls were represented by the horizontal axis, was made. The graph represented a straight line, and it was confirmed that a correct specific gravity solution was obtained.

(Measurement of Specific Gravity)

Fiber samples (the lengths of the samples: 6 mm to 8 mm) were put into the density gradient tube having been produced as described above. Positions of each fiber sample from the liquid level were measured immediately after, five hours after, and 24 hours after the fiber sample was put into the density gradient tube. A value of the specific gravity at the position of each sample was obtained by using the calibration curve having been made when the density gradient tube was produced.

Further, it was determined that a fiber sample of which the specific gravity value measured 24 hours later was greater than the specific gravity value measured five hours later, had, inside the fiber, pores communicating with the surface of the fiber.

(18) Crystallinity

A differential scanning calorimeter ("DSC measurement apparatus" manufactured by T. A. Instruments) was used, and "T. A. Universal Analysis" (manufactured by T. A. Instruments) was used for data analysis. A sample was cut so as to be less than or equal to 5 mg. About 2 mg of the sample was charged into and enclosed in an aluminum pan. A vacant aluminum pan similar thereto was used as a reference. The measurement was made in inert gas at a temperature ranging from 50° C. to 200° C., and a temperature rising rate was about 10° C./min. for the measurement. A baseline of a temperature rising DSC curve having been obtained was corrected, a peak area was divided by a weight of the sample, and a measurement melting heat amount was calculated, to obtain crystallinity according to the following equation.

$$\text{Crystallinity (\%)} = 100 \times (\text{measurement melting heat amount (J/g)})/(293 \text{ (J/g)})$$

(19) Measurement of Ratio Among Crystalline Components

A ratio among crystalline components was obtained by a high-resolution solid-state $^{13}$C NMR. Specifically, the measurement was made at room temperature by using "Avance400wb" (manufactured by (Brukerbiospin)). A magnetic field strength and a spin rate were 9.4 T and 4 kHz, respectively, in the measurement. A measurement pulse was according to Dipolar decoupling (DD)/MAS. A sample was cut so as to be strip-shaped, and was charged into a rotor. A DD/MAS spectrum was measured, by a single pulse method (DD/MAS method), with a waiting time being 4300 seconds, as a spectrum based on all components. Waveform was separated as monoclinic crystals, orthorhombic crystals, and amorphous components, from a low magnetic field side. A ratio thereamong was obtained according to an area ratio among areas of peaks of the monoclinic crystal, the orthorhombic crystal, and the amorphous component.

EXAMPLES

Hereinafter, the present invention will be described more specifically by way of examples. However, the present invention is not limited to examples described below, and modifications can be made, as appropriate, within the range of the gist described above and below, and any of the modifications is within the technical scope of the present invention.

Production Example 1

Pellets of a high-density polyethylene in which an intrinsic viscosity was 1.9 dL/g, a weight average molecular weight was 120,000, and a ratio of the weight average molecular weight to a number average molecular weight was 2.7, were charged into a container to which nitrogen gas was supplied at a pressure of 0.005 MPa. The pellets were supplied to an extruder, melted at 280° C., and discharged from a spinning nozzle having 360 holes each having an orifice diameter (nozzle diameter) of φ0.8 mm at a nozzle surface temperature of 280° C. at a single hole discharge rate of 0.4 g/min with a mesh diameter of a nozzle filter being 10 μm. Discharged filaments were caused to pass through a heat-retaining section which was 10 cm long, were then cooled by quenching air at an air speed of 0.5 m/sec. at an ambient temperature of 40° C., and were wound into a cheese shape at a spinning speed of 270 m/min., thereby obtaining non-drawn filaments.

Before the filaments were wound into a cheese shape, 2% by mass of an octapolyether/ethylene glycol (=80/20; mass ratio) mixture relative to the non-drawn filaments was applied. Thereafter, the non-drawn filaments were wound into the cheese shape and left stationary as they were for one day. As a portion of the octapolyether, octaethylene glycol monododecyl ether ($C_{12}H_{25}O(CH_2CH_2O)_8H$, molecular weight 538) was used. This organic substance has a high affinity for both a disperse dye and a polyethylene. The non-drawn filaments having the organic substance applied thereto were drawn 2.5-fold between two driving rollers in a state where a roller temperature and an ambient temperature were each set to 65° C., were then heated by hot air at 105° C., and were drawn 4.8-fold. Subsequently, the drawn filaments having been obtained were subjected to heat treatment at 120° C. for 0.2 seconds, and taken up at 25° C. at a tensile strength of 0.22 cN/dtex, thereby obtaining fiber filaments. Physical properties of the obtained fiber filaments, retention rates of the physical properties after acceleration test, TMA (thermo-mechanical analysis), retention rates of a storage modulus, and a content of the organic substance, are indicated in Table 1.

The obtained fiber filaments were used as a sheath yarn, and a 155 dtex spandex ("Espa (registered trademark)" manufactured by TOYOBO CO., LTD.) was used as a core yarn, to obtain a single covering yarn. The obtained single covering yarns were used to produce a knitted fabric having a weight per unit area which was 500 g/m², by using a weaving/knitting machine (manufactured by SHIMA SEIKI MFG, LTD). An Index value of the coup tester for the obtained knitted fabric is indicated in Table 1.

Further, the obtained fabric was used to obtain a dyed knitted fabric by using the method described in "(15) Dyeing method", and color fastness thereof was evaluated. The evaluation result is indicated in Table 3.

Production Example 2

Fiber filaments, a knitted fabric, and a dyed knitted fabric were obtained in the same manner as that for production example 1 except that heat treatment was conducted at 110° C. for 0.2 seconds. Physical properties of the obtained fiber filaments, retention rates of the physical properties after acceleration test, TMA (thermo-mechanical analysis), retention rates of a storage modulus, and a content of the organic substance, and an Index value of the knitted fabric, are indicated in Table 1. An evaluation result of color fastness is indicated in Table 3.

Production Example 3

Fiber filaments, a knitted fabric, and a dyed knitted fabric were obtained in the same manner as that for production example 1 except that heat treatment was conducted at 110° C. for 0.012 seconds. Physical properties of the obtained fiber filaments, retention rates of the physical properties after acceleration test, TMA (thermo-mechanical analysis), retention rates of a storage modulus, and a content of the organic substance, and an Index value of the knitted fabric, are indicated in Table 1. An evaluation result of color fastness is indicated in Table 3.

Production Example 4

Fiber filaments, a knitted fabric, and a dyed knitted fabric were obtained in the same manner as that for production example 1 except that a tensile strength was 0.41 cN/dtex. Physical properties of the obtained fiber filaments, retention rates of the physical properties after acceleration test, TMA (thermo-mechanical analysis), retention rates of a storage modulus, and a content of the organic substance, and an Index value of the knitted fabric, are indicated in Table 1. An evaluation result of color fastness is indicated in Table 3.

Production Example 5

Non-drawn filaments were obtained in the same manner as that for production example 1 except that filaments were wound into a cheese shape at a spinning speed of 330 m/min. The non-drawn filaments having been obtained were heated by hot air at 105° C., and were drawn 10-fold, and the drawn filaments were consecutively subjected to heat treatment at 120° C. for 0.2 seconds, and were taken up at 25° C. at a tensile strength of 0.22 cN/dtex, to obtain fiber filaments. The obtained fiber filaments were used to obtain a knitted fabric and a dyed knitted fabric as in production example 1. Physical properties of the obtained fiber filaments, retention rates of the physical properties after acceleration test, TMA (thermo-mechanical analysis), retention rates of a storage modulus, and a content of the organic substance, and an Index value of the knitted fabric, are indicated in Table 1. An evaluation result of color fastness is indicated in Table 3.

Production Example 6

Non-drawn filaments were obtained in the same manner as that for production example 1 except that a nitrogen gas supply pressure was 0.15 MPa, and a mesh diameter of a nozzle filter was 20 μm, and an organic substance to be applied to non-drawn filaments was a polypropylene glycol, and 3% by mass of the polypropylene glycol relative to the non-drawn filaments was applied. This organic substance had a high affinity for both a disperse dye and a polyethylene. Next, fiber filaments were obtained in the same manner as that for production example 1 except that the non-drawn filaments were drawn 2.5-fold between two driving rollers in a state where a roller temperature and an ambient temperature were each set to 45° C. Physical properties of the obtained fiber filaments, retention rates of the physical properties after acceleration test, TMA (thermo-mechanical analysis), retention rates of a storage modulus, and a content of the organic substance, and an Index value of a knitted fabric, are indicated in Table 1. An evaluation result of color fastness is indicated in Table 3.

Production Example 7

Non-drawn filaments were obtained in the same manner as that for production example 1 except that a nitrogen gas supply pressure was 0.5 MPa, and a mesh diameter of a nozzle filter was 80 μm, and an organic substance to be applied to non-drawn filaments was a polyethylene glycol/paraffin (=88/12; mass ratio), and 2% by mass of the polyethylene glycol/paraffin relative to the non-drawn filaments was applied. This organic substance had a high affinity for both a disperse dye and a polyethylene. The non-drawn filaments were drawn 2.0-fold between two driving rollers in a state where a roller temperature and an ambient temperature were each set to 25° C., were heated by hot air at 105° C., and were drawn 6.0-fold, to obtain fiber filaments. Physical properties of the obtained fiber filaments, retention rates of the physical properties after acceleration test, TMA (thermo-mechanical analysis), retention rates of a storage modulus, and a content of the organic substance, and an Index value of a knitted fabric, are indicated in Table 1. An evaluation result of color fastness is indicated in Table 3.

Production Example 8

Fiber filaments, a knitted fabric, and a dyed knitted fabric were obtained in the same manner as that for production example 1 except that heat treatment was carried out at 105° C. for 0.5 seconds, and a tensile strength was 0.28 cN/dtex. Physical properties of the obtained fiber filaments, retention rates of the physical properties after acceleration test, TMA (thermo-mechanical analysis), retention rates of a storage modulus, and a content of the organic substance, and an Index value of the knitted fabric, are indicated in Table 1. An evaluation result of color fastness is indicated in Table 3.

Production Example 9

Pellets of a high-density polyethylene in which an intrinsic viscosity was 1.9 dL/g, a weight average molecular weight was 120,000, and a ratio of the weight average molecular weight to a number average molecular weight was 2.7, were charged into a container to which nitrogen gas was supplied at a pressure of 0.005 MPa. The pellets were supplied to an extruder, melted at 280° C., and discharged from a spinning nozzle having 360 holes each having an orifice diameter of φ0.8 mm at a nozzle surface temperature of 280° C. at a single hole discharge rate of 0.4 g/min with a mesh diameter of a nozzle filter being 10 μm. Discharged filaments were caused to pass through a heat-retaining section which was 10 cm long, and were then cooled by quenching air at an air speed of 0.5 msec. at 40° C. Then, 2% by mass of an octapolyether/ethylene glycol (=80/20; mass ratio) mixture relative to non-drawn filaments was applied, and the non-drawn filaments were wound into a cheese shape at a spinning speed of 270 m/min., thereby obtaining non-drawn filaments.

The obtained non-drawn filaments were left stationary as they were for one day, were drawn 2.5-fold between two driving rollers in a state where a roller temperature and an ambient temperature were each set to 65° C., were then heated by hot air at 105° C., were drawn 4.8-fold, and were taken up at 25° C. at a tensile strength of 0.22 cN/dtex, to obtain fiber filaments. Physical properties of the obtained fiber filaments, retention rates of the physical properties after acceleration test, TMA (thermo-mechanical analysis), retention rates of a storage modulus, and a content of the organic substance, and an Index value of a knitted fabric, are indicated in Table 2. It was found that the fiber filaments obtained by no heat treatment having been performed thereon had low retention rates of the physical properties, and indicated a high thermal shrinking percentage and a high thermal shrinkage stress in the TMA, and dimensional stability was thus poor.

Production Example 10

Fiber filaments were obtained in the same manner as that for production example 9 except that heat treatment was carried out at 60° C. for 0.2 seconds. Physical properties of the obtained fiber filaments, retention rates of the physical properties after acceleration test, TMA (thermo-mechanical analysis), retention rates of a storage modulus, and a content of the organic substance, and an Index value of a knitted fabric, are indicated in Table 2. It was found that the fiber filaments obtained had low retention rates of the physical properties, and indicated a high thermal shrinking percentage and a high thermal shrinkage stress in the TMA, and dimensional stability was thus poor. It was found that the heat treatment was not sufficient, and the residual stress inside the fiber was not fully removed.

Production Example 11

Fiber filaments were obtained in the same manner as that for production example 9 except that heat treatment was carried out at 120° C. for 0.005 seconds. Physical properties of the obtained fiber filaments, retention rates of the physical properties after acceleration test, TMA (thermo-mechanical analysis), retention rates of a storage modulus, and a content of the organic substance, and an Index value of a knitted fabric, are indicated in Table 2. It was found that the fiber filaments obtained had low retention rates of the physical properties, and indicated a high thermal shrinking percentage and a high thermal shrinkage stress in the TMA, and dimensional stability was thus poor. It was found that the heat treatment was not sufficient, and the residual stress inside the fiber was not fully removed.

Production Example 12

Fiber filaments were obtained in the same manner as that for production example 9 except that heat treatment was carried out at 120° C. for 0.2 seconds, and a tensile strength was 0.55 cN/dtex. Physical properties of the obtained fiber filaments, retention rates of the physical properties after acceleration test, TMA (thermo-mechanical analysis), retention rates of a storage modulus, and a content of the organic substance, and an Index value of a knitted fabric, are indicated in table 2. It was found that the fiber filaments obtained had low retention rates of the physical properties, and indicated a high thermal shrinking percentage and a high thermal shrinkage stress in the TMA, and dimensional stability was thus poor. It was found that the stress was applied to the inside of the fiber by high tensile strength after the heat treatment.

Production Example 13

An ultrahigh molecular weight polyethylene in which an intrinsic viscosity was 8.2 dL/g, a weight average molecular weight was 1,020,000, and a ratio of the weight average molecular weight to a number average molecular weight was 5.2, was charged into a container to which nitrogen gas was supplied at a pressure of 0.005 MPa, was supplied to an extruder, and melted at 300° C. Spinning was attempted with a mesh diameter of a nozzle filter being 100 μm. However, extrusion from the nozzle was not able to be performed, and spinning was impossible.

Production Example 14

A slurry mixture of 90% by mass of decahydronaphthalene, and 10% by mass of an ultrahigh molecular weight polyethylene in which an intrinsic viscosity was 20 dL/g, a weight average molecular weight was 3,300,000, and a ratio of the weight average molecular weight to a number average molecular weight was 6.3, was melted by a screw-type kneader which was set to a temperature of 230° C. while being dispersed, and the melted mixture was supplied, by using a metering pump, at a single hole discharge rate of 1.0 g/min., to a spinnerette which was set to 170° C. and had 390 holes each having a diameter of 0.2 mm, and in which a mesh diameter of a nozzle filter was 200 μm.

Nitrogen gas that was adjusted to 100° C. was supplied at a speed of 1.2 m/min. by using a slit-shaped gas supply orifice provided vertically below a nozzle, so as to apply the nitrogen gas to filaments as uniformly as possible, thereby positively evaporating decahydronaphthalene on a surface of fiber filaments. Thereafter, the filaments were substantially cooled by air flow set to 30° C., and taken up at a speed of 50 m/min. by a Nelson roller provided downstream of the nozzle. At this time, a solvent contained in the filaments was reduced such that the mass of the solvent was about half of the mass of the originally contained solvent.

Subsequent thereto, the obtained fiber filaments were drawn 3-fold in an oven having been heated to 120° C. At this time, 0.5% by mass of an octapolyether/ethylene glycol (=80/20; mass ratio) mixture relative to drawn filaments was applied to the fiber filaments. The fiber filaments having been thus obtained were drawn 4.0-fold in an oven having been heated to 149° C. After drawn, the fiber filaments having been thus drawn were taken up at 25° C. at 1 cN/dtex without subjecting the fiber filaments to heat treatment. Physical properties of the obtained fiber filaments, retention rates of the physical properties after acceleration test, TMA (thermo-mechanical analysis), retention rates of a storage modulus, and a content of the organic substance, and an Index value of the knitted fabric are indicated in Table 2. The retention rates of the physical properties after acceleration test, the thermal shrinking percentage, the thermal shrinkage stress, and the retention rates of the storage modulus indicated very favorable values. However, a residual solvent indicated 500 ppm, which was a high value. Further, pores were not found in the fiber filaments, and the porosity and the degree of exhaustion were very low.

Further, production of a dyed knitted fabric was attempted by using the obtained fiber filaments in the same manner as in production example 1. However, dyeing to such a degree as to allow conducting a test for color fastness, was not performed. Thus, the test was stopped.

Production Example 15

Pellets of a high-density polyethylene in which an intrinsic viscosity was 0.7 dL/g, a weight average molecular weight was 42,000, and a ratio of the weight average molecular weight to a number average molecular weight was 5.1, were charged into a container to which nitrogen gas was supplied at a pressure of 0.005 MPa. The pellets were supplied to an extruder, melted at 230° C., and discharged from a spinning nozzle having 360 holes each having an orifice diameter of φ0.8 mm at a nozzle surface temperature of 230° C. at a single hole discharge rate of 0.4 g/min. with a mesh diameter of a nozzle filter being 10 μm. 1.0% by mass of an octapolyether/ethylene glycol (=80/20; mass ratio) mixture relative to the non-drawn filaments was applied, and the non-drawn filaments were wound into a cheese shape at a spinning speed of 270 m/min., thereby obtaining non-drawn filaments.

The obtained non-drawn filaments were left stationary as they were for one day, and were drawn 1.2-fold between two driving rollers in a state where a roller temperature and an ambient temperature were each set to 65° C., were then heated by hot air at 100° C., were drawn 5.0-fold, and the drawn filaments were consecutively subjected to heat treatment at 120° C. for 0.2 seconds, and then taken up at 25° C. at a tensile strength of 0.22 cN/dtex, to obtain fiber filaments. Physical properties of the obtained fiber filaments, retention rates of the physical properties after acceleration test, TMA (thermo-mechanical analysis), retention rates of a storage modulus, and a content of the organic substance, and an Index value of a knitted fabric, are indicated in Table 2. Mechanical properties of the obtained fiber filaments indicated low values and the retention rates of the physical properties also indicated low values. Further, the Index value of the knitted fabric was also low. Furthermore, pores in the fiber filaments were small, and the porosity and the degree of exhaustion were very low.

Further, production of a dyed knitted fabric was attempted by using the obtained fiber filaments in the same manner as in production example 1. However, dyeing to such a degree as to allow conducting a test for color fastness, was not performed. Thus, the test was stopped.

Production Example 16

Fiber filaments were obtained in the same manner as that for production example 1 except that a nitrogen gas supply pressure was 0.9 MPa, a mesh diameter of a nozzle filter was 200 μm, and a temperature for drawing was 90° C. in the first drawing step. Physical properties of the obtained fiber filaments, retention rates of the physical properties after acceleration test, TMA (thermo-mechanical analysis), retention rates of a storage modulus, and a content of the organic substance, and an Index value of a knitted fabric, are indicated in Table 1. The content of the organic substance in the obtained fiber filaments indicated a very low value.

Further, production of a dyed knitted fabric was attempted by using the obtained fiber filaments in the same manner as in production example 1. However, dyeing to such a degree as to allow conducting a test for color fastness, was not performed. Thus, the test was stopped.

Dyed highly functional polyethylene fibers obtained by dyeing the above-described fibers two colors were evaluated for fastness to washing and fastness to dry cleaning as described above. All of the obtained results indicated grade 3 or higher grade, and were excellent. Further, fastness to light (JIS L 0842) favorably indicated grade 3 or higher grade.

TABLE 1

| | | Unit | Production example 1 | Production example 2 | Production example 3 | Production example 4 | Production example 5 | Production example 6 | Production example 7 | Production example 8 |
|---|---|---|---|---|---|---|---|---|---|---|
| Characteristic of raw material | Intrinsic viscosity | [dL/g] | 1.9 | 1.9 | 1.9 | 1.9 | 1.9 | 1.9 | 1.9 | 1.9 |
| | Mw | [g/mol] | 120,000 | 120,000 | 120,000 | 120,000 | 120,000 | 120,000 | 120,000 | 120,000 |
| | Mw/Mn | — | 2.7 | 2.7 | 2.7 | 2.7 | 2.7 | 2.7 | 2.7 | 2.7 |
| Spinning method | | | melt spinning | melt spinning | melt spinning | melt spinning | melt spinning | melt spinning | melt spinning | melt spinning |
| Spinning process | Inert gas (nitrogen) supply pressure | [MPa] | 0.005 | 0.005 | 0.005 | 0.005 | 0.005 | 0.15 | 0.5 | 0.005 |
| | Nozzle filter mesh diameter | [μm] | 10 | 10 | 10 | 10 | 10 | 20 | 80 | 10 |
| | Nozzle temperature | [° C.] | 280 | 280 | 280 | 280 | 280 | 280 | 280 | 280 |
| | Single hole discharge rate | [g/min] | 0.4 | 0.4 | 0.4 | 0.4 | 0.4 | 0.4 | 0.4 | 0.4 |
| | Spinning speed | [m/min] | 270 | 270 | 270 | 270 | 330 | 270 | 270 | 270 |
| Drawing process | First step Temperature | [° C.] | 65 | 65 | 65 | 65 | — | 45 | 25 | 65 |
| | Draw ratio | [-fold] | 2.5 | 2.5 | 2.5 | 2.5 | — | 2.5 | 2.0 | 2.5 |
| | Second step Temperature | [° C.] | 105 | 105 | 105 | 105 | 105 | 105 | 105 | 105 |
| | Draw ratio | [-fold] | 4.8 | 4.8 | 4.8 | 4.8 | 10.0 | 4.8 | 6.0 | 4.8 |
| Heat treatment process | Processing temperature | [° C.] | 120 | 110 | 110 | 120 | 120 | 120 | 120 | 105 |
| | Processing time | [sec] | 0.2 | 0.2 | 0.012 | 0.2 | 0.2 | 0.2 | 0.2 | 0.5 |
| Taking-up process | Taking-up tensile strength | [cN/dtex] | 0.22 | 0.22 | 0.22 | 0.41 | 0.22 | 0.22 | 0.22 | 0.28 |
| Physical properties of fiber filament | Intrinsic viscosity | [dL/g] | 1.8 | 1.8 | 1.8 | 1.8 | 1.8 | 1.8 | 1.8 | 1.8 |
| | Strength | [cN/dtex] | 15.3 | 15.4 | 15 | 15.6 | 12.1 | 14.8 | 15.0 | 15.1 |
| | Elongation | [%] | 6.0 | 5.7 | 5.5 | 5.2 | 7.1 | 4.9 | 4.8 | 6.0 |
| | Modulus | [cN/dtex] | 582.0 | 601.1 | 627.1 | 612.3 | 485.1 | 545.6 | 542.1 | 595.0 |
| | Thermal shrinking percentage at 100° C. | [%] | 1.2 | 1.4 | 1.5 | 1.5 | 1.7 | 1.3 | 1.5 | 2.3 |
| | The number of pores per unit cross-sectional area | [piece/μm²] | 18 | 22 | 21 | 19 | 12 | 8 | 12 | 16 |
| | Average pore diameter | [nm] | 41 | 45 | 46 | 39 | 15 | 56 | 43 | 52 |
| | Porosity | [%] | 2.8 | 3.0 | 3.1 | 2.9 | 1.8 | 6.3 | 4.2 | 5.1 |
| | Degree of exhaustion | [%] | 28 | 31 | 32 | 27 | 20 | 43 | 43 | 33 |
| | Content of organic substance in fiber filament | [% by mass] | 0.5 | 0.7 | 0.8 | 0.5 | 0.4 | 0.8 | 0.6 | 0.5 |
| Thermo-mechanical analysis | Maximum shrinkage temperature | [° C.] | 115.5 | 113.6 | 110.6 | 115.5 | 106.7 | 104.2 | 104.2 | 107.8 |
| | Maximum thermal shrinkage stress | [cN/dtex] | 0.29 | 0.37 | 0.39 | 0.29 | 0.32 | 0.26 | 0.26 | 0.37 |
| | Thermal shrinkage stress at 50° C. | [cN/dtex] | 0.037 | 0.042 | 0.045 | 0.042 | 0.039 | 0.039 | 0.039 | 0.037 |
| | Thermal shrinkage stress at 80° C. | [cN/dtex] | 0.092 | 0.153 | 0.186 | 0.168 | 0.137 | 0.133 | 0.133 | 0.096 |
| Storage modulus | Retention rate of storage modulus at 50° C. relative to storage modulus at 30° C. | [%] | 86.1 | 82.7 | 82.1 | 87.2 | 86.8 | 84.3 | 82.3 | 81.1 |
| | Retention rate of storage modulus at 80° C. relative to storage modulus at 30° C. | [%] | 60.5 | 58.8 | 57.9 | 56.4 | 59.9 | 57.3 | 56.4 | 57.8 |
| | Retention rate of storage modulus at 105° C. relative to storage modulus at 30° C. | [%] | 40.4 | 38.2 | 37.3 | 36.8 | 41.1 | 42.3 | 45.6 | 39.6 |
| Crystal dispersion temperature | | [° C.] | 75.0 | 74.8 | 73.2 | 74.2 | 75.1 | 73.8 | 72.1 | 75.0 |
| Retention rate of physical properties | Strength (after processing at 60° C. for 24 hours) | [%] | 99.7 | 99.3 | 99.4 | 99.7 | 99.7 | 99.7 | 99.6 | 99.8 |
| | Elongation (after processing at 60° C. for 24 hours) | [%] | 98.2 | 100.2 | 103.6 | 104.1 | 104.1 | 102.4 | 103.5 | 98.3 |
| | Modulus (after processing at 60° C. for 24 hours) | [%] | 98.9 | 97.6 | 97.0 | 96.3 | 96.3 | 97.3 | 96.5 | 98.9 |
| Amount of residual solvent | | [ppm] | 0 | 0 | 0 | 0 | 0 | 0 | 0 | 0 |
| Cut-resistance (Index value) | | [—] | 4.0 | 3.9 | 3.7 | 3.9 | 3.6 | 4.1 | 4.3 | 4.0 |

TABLE 2

| | | Unit | Production example 9 | Production example 10 | Production example 11 | Production example 12 | Production example 13 | Production example 14 | Production example 15 | Production example 16 |
|---|---|---|---|---|---|---|---|---|---|---|
| Characteristic of raw material | Intrinsic viscosity | [dL/g] | 1.9 | 1.9 | 1.9 | 1.9 | 8.2 | 20 | 0.7 | 1.9 |
| | Mw | [g/mol] | 120,000 | 120,000 | 120,000 | 120,000 | 1,020,000 | 3,300,000 | 42,000 | 120,000 |
| | Mw/Mn | — | 2.7 | 2.7 | 2.7 | 2.7 | 5.2 | 6.3 | 5.1 | 2.7 |
| Spinning method | | | melt spinning | melt spinning | melt spinning | melt spinning | melt spinning | solution spinning | melt spinning | melt spinning |
| Spinning process | Inert gas (nitrogen) supply pressure | [MPa] | 0.005 | 0.005 | 0.005 | 0.005 | 0.005 | — | 0.005 | 0.9 |
| | Nozzle filter mesh diameter | [μm] | 10 | 10 | 10 | 10 | 100 | 200 | 10 | 200 |
| | Nozzle temperature | [° C.] | 280 | 280 | 280 | 280 | 300 | 170 | 230 | 280 |
| | Single hole discharge rate | [g/min] | 0.4 | 0.4 | 0.4 | 0.4 | cannot be discharged | 1.0 | 0.4 | 0.4 |
| Drawing process | Spinning speed | [m/min] | 270 | 270 | 270 | 270 | — | 50 | 270 | 270 |
| | First step Temperature | [° C.] | 65 | 65 | 65 | 65 | — | 120 | 65 | 90 |
| | First step Draw ratio | [-fold] | 2.5 | 2.5 | 2.5 | 2.5 | — | 3.0 | 1.2 | 2.5 |
| | Second Temperature | [° C.] | 105 | 105 | 105 | 105 | — | 149 | 100 | 105 |
| | Second Draw ratio | [-fold] | 4.8 | 4.8 | 4.8 | 4.8 | — | 4.0 | 5.0 | 4.8 |
| Heat treatment process | Processing temperature | [° C.] | — | 60 | 120 | 120 | — | — | 120 | 120 |
| | Processing time | [sec] | — | 0.2 | 0.005 | 0.2 | — | — | 0.2 | 0.2 |
| Taking-up process | Taking-up tensile strength | [cN/dtex] | 0.22 | 0.22 | 0.22 | 0.55 | — | 1.0 | 0.22 | 0.22 |
| Physical properties of fiber filament | Intrinsic viscosity | [dL/g] | 1.8 | 1.8 | 1.8 | 1.8 | — | 18.0 | 0.6 | 1.8 |
| | Strength | [cN/dtex] | 15.9 | 15.8 | 15.9 | 15.9 | — | 30.2 | 6.5 | 13.2 |
| | Elongation | [%] | 4.9 | 5 | 4.9 | 4.9 | — | 3.1 | 10.1 | 4.3 |
| | Modulus | [cN/dtex] | 657.2 | 643.8 | 657.2 | 657.2 | — | 1010.3 | 212.1 | 428.5 |
| | Thermal shrinkage percentage at 100° C. | [%] | 2.7 | 2.6 | 2.6 | 2.9 | — | 1.0 | 5.8 | 1.0 |
| | The number of pores per unit cross-sectional area | [piece/μm²] | 18 | 24 | 22 | 22 | — | 0 | 8 | 0 |
| | Average pore diameter | [nm] | 41 | 51 | 42 | 48 | — | — | 8 | 0 |
| | Porosity | [%] | 2.8 | 3.0 | 2.7 | 3.3 | — | 0.1 | 0.1 | 0.7 |
| | Degree of exhaustion | [%] | 28 | 31 | 30 | 27 | — | 14 | 4 | 5 |
| | Content of organic substance in fiber filament | [% by mass] | 0.5 | 0.6 | 0.6 | 0.5 | — | <0.005 | <0.005 | 0.1 |

TABLE 2-continued

| | | Unit | Production example 9 | Production example 10 | Production example 11 | Production example 12 | Production example 13 | Production example 14 | Production example 15 | Production example 16 |
|---|---|---|---|---|---|---|---|---|---|---|
| Thermo-mechanical analysis | Maximum shrinkage temperature | [° C.] | 109.3 | 106.5 | 109.4 | 110.8 | — | 142.9 | 109.4 | 103.6 |
| | Maximum thermal shrinkage stress | [cN/dtex] | 0.45 | 0.42 | 0.43 | 0.42 | — | 0.46 | 0.28 | 0.18 |
| | Thermal shrinkage stress at 50° C. | [cN/dtex] | 0.067 | 0.060 | 0.075 | 0.067 | — | 0.035 | 0.025 | 0.028 |
| | Thermal shrinkage stress at 80° C. | [cN/dtex] | 0.206 | 0.187 | 0.186 | 0.206 | — | 0.069 | 0.101 | 0.121 |
| Storage modulus | Retention rate of storage modulus at 50° C. relative to storage modulus at 30° C. | [%] | 78.0 | 77.9 | 80.1 | 81.2 | — | 90.8 | 80.5 | 90.1 |
| | Retention rate of storage modulus at 80° C. relative to storage modulus at 30° C. | [%] | 47.8 | 48.9 | 48.8 | 49.3 | — | 69.5 | 46.4 | 70 |
| | Retention rate of storage modulus at 105° C. relative to storage modulus at 30° C. | [%] | 28.1 | 28.5 | 29.2 | 29.3 | — | 49.8 | 26.5 | 47.8 |
| Crystal dispersion temperature | | [° C.] | 72.1 | 73.1 | 74.8 | 73.2 | — | 79.5 | 71.8 | 73.2 |
| Retention rate of physical properties | Strength (after processing at 60° C. for 24 hours) | [%] | 98.5 | 98.5 | 99.1 | 98.5 | — | 99.9 | 98.3 | 99.1 |
| | Elongation (after processing at 60° C. for 24 hours) | [%] | 116.2 | 114.3 | 110.3 | 116.2 | — | 101.0 | 108.4 | 102.3 |
| | Modulus (after processing at 60° C. for 24 hours) | [%] | 91.5 | 92.8 | 92.8 | 91.5 | — | 97.0 | 89.5 | 100 |
| Amount of residual solvent | | [ppm] | 0 | 0 | 0 | 0 | — | 500 | 0 | 0 |
| Cut-resistance (Index value) | | [—] | 4.2 | 4.1 | 3.9 | 3.8 | — | 6.0 | 2.1 | 3.6 |

TABLE 3

| Color fastness test | | Production example 1 | | Production example 2 | | Production example 3 | | Production example 4 | | Production example 5 | | Production example 6 | | Production example 7 | | Production example 8 | |
|---|---|---|---|---|---|---|---|---|---|---|---|---|---|---|---|---|---|
| Testing method | Kind | blue | black | blue | black | blue | black | blue | black | blue | black | blue | black | blue | black | blue | black |
| Washing JIS-L-0844 A-1 | Change in color (grade) | 4 | 4 | 4 | 4 | 4 | 4 | 4 | 4 | 3 | 3 | 4 | 3 | 4 | 4 | 4 | 4 |
| | Staining in cotton (grade) | 5 | 4 | 5 | 4 | 5 | 4 | 4 | 4 | 3 | 3 | 4 | 4 | 4 | 3 | 4 | 4 |
| | Staining in PET (grade) | 5 | 5 | 5 | 5 | 5 | 5 | 4 | 4 | 3 | 3 | 4 | 3 | 4 | 4 | 4 | 4 |
| Rubbing JIS-L-0849 Type II | Dry - staining (grade) | 4 | 4 | 4 | 4 | 4 | 4 | 4 | 3 | 3 | 3 | 4 | 3 | 4 | 3 | 4 | 3 |
| | Wet - staining (grade) | 5 | 4 | 5 | 4 | 5 | 4 | 4 | 3 | 3 | 3 | 4 | 3 | 4 | 3 | 4 | 3 |
| Perspiration (acidic) JIS-L-0848 | Change in color (grade) | 5 | 4 | 4 | 4 | 4 | 4 | 4 | 4 | 3 | 3 | 4 | 3 | 4 | 3 | 4 | 4 |
| | Staining in cotton (grade) | 5 | 3 | 4 | 4 | 5 | 3 | 5 | 4 | 3 | 3 | 4 | 4 | 4 | 4 | 4 | 4 |
| | Staining in PET (grade) | 5 | 3 | 5 | 3 | 5 | 3 | 5 | 3 | 3 | 3 | 4 | 3 | 4 | 3 | 4 | 3 |
| Perspiration (alkaline) JIS-L-0848 | Change in color (grade) | 5 | 3 | 5 | 3 | 5 | 4 | 4 | 3 | 3 | 3 | 4 | 3 | 4 | 3 | 4 | 3 |
| | Staining in cotton (grade) | 5 | 3 | 5 | 3 | 5 | 3 | 4 | 3 | 3 | 3 | 4 | 3 | 4 | 4 | 4 | 3 |
| | Staining in PET (grade) | 4 | 4 | 4 | 4 | 4 | 4 | 4 | 4 | 3 | 3 | 4 | 4 | 4 | 4 | 4 | 4 |
| Dry cleaning (perchlo) JIS-L-0860 Method A-1 | Change in color (grade) | 4 | 3 | 4 | 3 | 4 | 3 | 3 | 3 | 3 | 3 | 3 | 3 | 3 | 3 | 3 | 3 |
| | Staining in multiple materials (grade) | 4 | 5 | 4 | 5 | 4 | 4 | 4 | 4 | 3 | 3 | 3 | 4 | 3 | 3 | 4 | 3 |
| Dry cleaning (petroleum) JIS-L-0860 Method B-1 | Change in color (grade) | 5 | 3 | 5 | 3 | 5 | 3 | 4 | 3 | 3 | 3 | 4 | 3 | 4 | 3 | 4 | 3 |
| | Staining in multiple materials (grade) | 4 | 5 | 4 | 5 | 4 | 5 | 4 | 4 | 3 | 3 | 3 | 4 | 3 | 4 | 3 | 4 |

Production Example 17

Pellets of a high-density polyethylene in which an intrinsic viscosity was 1.9 dL/g, a weight average molecular weight was 120,000, and a ratio of the weight average molecular weight to a number average molecular weight was 2.7, were charged into a container to which nitrogen gas was supplied at a pressure of 0.005 MPa. The pellets were supplied to an extruder, melted at 280° C., and discharged from a spinning nozzle having 360 holes each having an orifice diameter of φ0.8 mm at a nozzle surface temperature of 280° C. at a single hole discharge rate of 0.4 g/min. with a mesh diameter of a nozzle filter being 10 μm. Discharged filaments were caused to pass through a heat-retaining section which was 10 cm long, were then cooled by quenching air at an air speed of 0.5 msec. at an ambient temperature of 40° C., and were wound into a cheese shape at a spinning speed of 270 m/min., thereby obtaining non-drawn filaments.

Before the filaments were wound into a cheese shape, 2% by mass of a polypropylene glycol/ethylene glycol (=80/20; mass ratio) mixture relative to the non-drawn filaments was applied. Thereafter, the non-drawn filaments were wound into the cheese shape and left stationary as they were for one day. This organic substance has a high affinity for both a disperse dye and a polyethylene. Subsequently, the non-drawn filaments having been obtained were drawn 2.5-fold between two driving rollers in a state where a roller temperature and an ambient temperature were each set to 65° C., were then heated by hot air at 105° C., and were drawn 4.8-fold. Subsequently, the drawn filaments having been obtained were subjected to heat treatment at 120° C. for 0.2 seconds, and taken up at 25° C. at a tensile strength of 0.22 cN/dtex, to obtain fiber filaments. Physical properties of the obtained fiber filaments and a maximum amount of change in storage modulus are indicated in Table 4.

The obtained fiber filaments were used as a sheath yarn, and a 155 dtex spandex ("Espa (registered trademark)" manufactured by TOYOBO CO., LTD.) was used as a core yarn, to obtain a single covering yarn. The obtained single covering yarns were used to produce a knitted fabric having a weight per unit area which was 500 g/m$^2$, by using a weaving/knitting machine (manufactured by SHIMA SEIKI MFG, LTD). An Index value of the coup tester for the obtained knitted fabric is indicated in Table 4.

Further, the obtained fabric was used to obtain a dyed knitted fabric by using the method described in "(15) Dyeing method", and color fastness thereof was evaluated. The evaluation result is indicated in Table 6.

Production Example 18

Fiber filaments, a knitted fabric, and a dyed knitted fabric were obtained in the same manner as that for production example 17 except that heat treatment was carried out at 110° C. for 0.2 seconds. Evaluation results of the obtained fiber filaments and the knitted fabric are indicated in Table 4 and results of color fastness are indicated in Table 6.

Production Example 19

Fiber filaments, a knitted fabric, and a dyed knitted fabric were obtained in the same manner as that for production example 17 except that a heat treatment was carried out at 110° C. for 0.012 seconds. Evaluation results of the obtained fiber filaments and the knitted fabric are indicated in Table 4 and results of color fastness are indicated in Table 6.

Production Example 20

Fiber filaments, a knitted fabric, and a dyed knitted fabric were obtained in the same manner as that for production example 17 except that a tensile strength was 0.41 cN/dtex. Evaluation results of the obtained fiber filaments and the knitted fabric are indicated in Table 4 and results of color fastness are indicated in Table 6.

Production Example 21

Non-drawn filaments were obtained in the same manner as that for production example 17 except that filaments were wound into a cheese shape at a spinning speed of 330 m/min., in a spinning deformation time of 0.4 min. The non-drawn filaments having been obtained were heated by hot air at 105° C. and were drawn 10-fold such that a drawing time was 3.3 min. Thereafter, the drawn filaments were consecutively subjected to heat treatment at 120° C. for 0.2 seconds, and were taken up at 25° C. at a tensile strength of 0.22 cN/dtex, to obtain fiber filaments. The obtained fiber filaments were used to obtain a knitted fabric and a dyed knitted fabric in the same manner as in production example 17. Evaluation results of the fiber filaments and the knitted fabric are indicated in Table 4 and results of the dyeing are indicated in Table 6.

Production Example 22

Non-drawn filaments were obtained in the same manner as that for production example 17 except that a nitrogen supply pressure was 0.15 MPa, and a mesh diameter of a nozzle filter was 20 μm, and a spinning deformation time was 1.9 min. The non-drawn filaments having been obtained were drawn 2.5-fold between two driving rollers in a state where a roller temperature and an ambient temperature were each set to 45° C., were then heated by hot air at 105° C., and were drawn 4.8-fold. Subsequently, the drawn filaments having been obtained were subjected to heat treatment at 120° C. for 0.2 seconds, and taken up at 35° C. at a tensile strength of 0.22 cN/dtex, to obtain fiber filaments. The obtained fiber filaments were used to obtain a knitted fabric and a dyed knitted fabric in the same manner as in production example 17. Evaluation results of the fiber filaments and the knitted fabric are indicated in Table 4 and results of the dyeing is indicated in Table 6.

Production Example 23

Pellets of a high-density polyethylene in which an intrinsic viscosity was 1.9 dL/g, a weight average molecular weight was 120,000, and a ratio of the weight average molecular weight to a number average molecular weight was 2.7, were charged into a container to which nitrogen gas was supplied at a pressure of 0.005 MPa. The pellets were supplied to an extruder, melted at 280° C., and discharged from a spinning nozzle having 360 holes each having an orifice diameter of φ0.8 mm at a nozzle surface temperature of 280° C. at a single hole discharge rate of 0.4 g/min. Discharged filaments were caused to pass through a heat-retaining section which was 10 cm long, were then cooled by quenching air at an air speed of 0.5 msec. at 40° C., and were wound into a cheese shape at a spinning speed of 270 m/min., in a spinning deformation time of 0.8 min., to obtain non-drawn filaments.

Before the filaments were wound into a cheese shape, 2% by mass of a polypropylene glycol/ethylene glycol (=80/20; mass ratio) mixture relative to the non-drawn filaments was applied. Thereafter, the non-drawn filaments were wound into the cheese shape and left stationary as they were for one day. This organic substance had a high affinity for both a disperse dye and a polyethylene. The non-drawn filaments having been obtained were drawn 2.5-fold between two driving rollers in a state where a roller temperature and an ambient temperature were each set to 65° C., were then heated by hot air at 105° C., and were drawn 4.8-fold such that the drawing deformation time was 5.6 min. The obtained filaments were then taken up at 25° C. at a tensile strength of 0.22 cN/dtex, to obtain fiber filaments. Physical properties of the obtained fiber filaments, a retention rate of a storage modulus, and retention rates of mechanical properties are indicated in Table 1. The obtained fiber filaments had a low retention rate of the storage modulus, and also had low retention rates of the physical properties. Since the drawing deformation time was long and heat treatment was insufficient, a ratio of monoclinic crystals was high, and a ratio of orthorhombic crystals was low. Therefore, an influence due to a residual stress in the fiber filaments being not sufficiently removed, was considered.

Production Example 24

Fiber filaments were obtained in the same manner as that for production example 23 except that heat treatment was carried out at 60° C. for 0.2 seconds. Physical properties of the obtained fiber filaments, retention rates of a storage modulus, and retention rates of the physical properties, are indicated in Table 5. The obtained fiber filaments had a low retention rate of the storage modulus, and also had low retention rates of the physical properties. The drawing deformation time was long and heat treatment was insufficient, and an influence due to a residual stress in the fiber filaments being not sufficiently removed, was considered.

Production Example 25

Fiber filaments were obtained in the same manner as that for production example 23 except that heat treatment was carried out at 120° C. for 0.005 seconds. Physical properties of the obtained fiber filaments, retention rates of a storage modulus, and retention rates of the physical properties, are indicated in Table 5. The obtained fiber filaments had a low retention rate of the storage modulus, and also had low retention rates of the physical properties. The drawing deformation time was long and heat treatment was insufficient, and an influence due to a residual stress in the fiber filaments being not sufficiently removed, was considered.

Production Example 26

Fiber filaments were obtained in the same manner as that for production example 23 except that a spinning deformation time was 3.3 min, heat treatment was carried out at 120° C. for 0.2 seconds, and a tensile strength was 0.55 cN/dtex. Physical properties of the obtained fiber filaments, retention rates of a storage modulus, and retention rates of the physical properties, are indicated in Table 5. The obtained fiber filaments had a low retention rate of the storage modulus, and also had low retention rates of the physical properties. It was found that the stress was applied to the inside of the fiber by high tensile strength after the heat treatment.

Production Example 27

An ultrahigh molecular weight polyethylene in which an intrinsic viscosity was 8.2 dL/g, a weight average molecular weight was 1,020,000, and a ratio of the weight average molecular weight to a number average molecular weight was 5.2, was heated at 300° C., and spinning was attempted. However, discharge from a nozzle was not able to be performed, and spinning was impossible.

Production Example 28

A slurry mixture of 90% by mass of decahydronaphthalene, and 10% by mass of an ultrahigh molecular weight polyethylene in which an intrinsic viscosity was 20 dL/g, a weight average molecular weight was 3,300,000, and a ratio of the weight average molecular weight to a number average molecular weight was 6.3, was melted by a screw-type kneader which was set to a temperature of 230° C. while being dispersed, and the melted mixture was supplied to a spinnerette which was set to 170° C. and had 260 holes each having a diameter of 0.8 mm, by using a metering pump, at a single hole discharge rate of 1.0 g/min.

Nitrogen gas that was adjusted to 100° C. was supplied at a speed of 1.2 m/min. by using a slit-shaped gas supply orifice provided vertically below a nozzle, so as to apply the nitrogen gas to filaments as uniformly as possible, thereby positively evaporating decahydronaphthalene on a surface of fiber filaments. Thereafter, the filaments were substantially cooled by air flow set to 30° C., and taken up at a speed of 50 m/min. by a Nelson roller provided downstream of the nozzle. At this time, a solvent contained in the filaments was reduced such that the mass of the solvent was about half of the mass of the originally contained solvent.

Subsequent thereto, the obtained fiber filaments were drawn 3-fold in an oven having been heated to 120° C. The fiber filaments were drawn 4.0-fold in an oven having been heated to 149° C. After drawn, the fiber filaments were taken up at 25° C. at 1 cN/dtex without subjecting the fiber filaments to heat treatment. At this time, the spinning deformation time was 0.5 min., and the drawing deformation time was 2.2 min. Physical properties of the obtained fiber filaments, a retention rate of a storage modulus, and retention rates of mechanical properties are indicated in Table 5. A value of a residual solvent was 1200 ppm, which was a high value.

Production Example 29

Pellets of a high-density polyethylene in which an intrinsic viscosity was 0.7 dL/g, a weight average molecular weight was 42,000, and a ratio of the weight average molecular weight to a number average molecular weight was 5.1, were charged into a container to which nitrogen gas was supplied at a pressure of 0.005 MPa. The pellets were supplied to an extruder, melted at 230° C., and discharged from a spinning nozzle having 360 holes each having an orifice diameter of φ0.8 mm at a nozzle surface temperature of 230° C. at a single hole discharge rate of 0.4 g/min. Discharged filaments were caused to pass through a heat-retaining section which was 10 cm long, were then cooled by quenching air at an air speed of 0.5 m/sec. at 40° C., and were wound into a cheese shape at a spinning speed of 270 m/min., to obtain non-drawn filaments. The non-drawn filaments having been obtained were drawn 2.0-fold between two driving rollers in a state where a roller temperature and an ambient temperature were each set to 65° C., were then heated by hot air at 100° C., and were drawn 4.0-fold. Subsequently, the drawn filaments having been obtained were consecutively subjected to heat treatment at 120° C. for 0.2 seconds, and taken up at 25° C. at a tensile strength of 0.22 cN/dtex. The process other than those described above were the same as in production example 23. Thus, fiber filaments were obtained. Physical properties of the obtained fiber filaments and a maximum amount of change in storage modulus, are indicated in Table 5. The obtained fiber filaments were low in mechanical properties, and the retention rate of the storage modulus and the retention rates of the mechanical properties were significantly reduced.

Production Example 30

Fiber filaments were obtained in the same manner as that for production example 17 except that a spinning deformation time was 0.2 min, and a drawing deformation time was 5.2 min. Physical properties of the obtained fiber filaments, a maximum change amount of a storage modulus are indicated in Table 5. The retention rate of the storage modulus and the retention rates of the mechanical properties were significantly reduced in the obtained fiber filaments.

Production Example 31

Fiber filaments were obtained in the same manner as that for production example 17 except that a spinning deformation time was 0.2 min, and a drawing deformation time was 4.8 min, and a tensile strength was 0.58 cN/dtex. Physical properties of the obtained fiber filaments, retention rates of a storage modulus, and retention rates of the physical properties, are indicated in Table 5. The retention rate of the storage modulus and the retention rates of the mechanical properties were significantly reduced in the obtained fiber filaments.

TABLE 4

| | | Unit | Production example 17 | Production example 18 | Production example 19 | Production example 20 | Production example 21 | Production example 22 |
|---|---|---|---|---|---|---|---|---|
| Characteristic of raw material | Intrinsic viscosity | [dL/g] | 1.9 | 1.9 | 1.9 | 1.9 | 1.9 | 1.9 |
| | Mw | [g/mol] | 120,000 | 120,000 | 120,000 | 120,000 | 120,000 | 120,000 |
| | Mw/Mn | — | 2.7 | 2.7 | 2.7 | 2.7 | 2.7 | 2.7 |
| Spinning method | | | melt spinning | melt spinning | melt spinning | melt spinning | melt spinning | melt spinning |
| Spinning process | Inert gas (nitrogen) supply pressure | [MPa] | 0.005 | 0.005 | 0.005 | 0.005 | 0.005 | 0.15 |
| | Melt-extrusion temperature | [° C.] | 280 | 280 | 280 | 280 | 280 | 280 |
| | Nozzle filter mesh diameter | [μm] | 10 | 10 | 10 | 10 | 10 | 20 |
| | Nozzle diameter | [mm] | 0.8 | 0.8 | 0.8 | 0.8 | 0.8 | 0.8 |
| | Nozzle temperature | [° C.] | 280 | 280 | 280 | 280 | 280 | 280 |
| | Single hole discharge rate | [g/min] | 0.4 | 0.4 | 0.4 | 0.4 | 0.4 | 0.4 |
| | Spinning speed | [m/min] | 270 | 270 | 270 | 270 | 330 | 270 |
| | Spinning deformation ratio | [-fold] | 253 | 253 | 253 | 253 | 309 | 253 |
| | Spinning deformation time | [minute] | 0.5 | 0.5 | 0.5 | 0.5 | 0.4 | 1.9 |
| Drawing process | First Step | Temperature [° C.] | 65 | 65 | 65 | 65 | — | 45 |
| | | Draw ratio [-fold] | 2.5 | 2.5 | 2.5 | 2.5 | — | 2.5 |
| | Second Step | Temperature [° C.] | 105 | 105 | 105 | 105 | 105 | 105 |
| | | Draw ratio [-fold] | 4.8 | 4.8 | 4.8 | 4.8 | 10.0 | 4.8 |
| | Drawing deformation ratio | [-fold] | 12.0 | 12.0 | 12.0 | 12.0 | 10.0 | 12.0 |
| | Drawing deformation time | [minute] | 2.6 | 2.6 | 2.6 | 2.6 | 3.3 | 2.6 |
| Heat treatment process | Processing temperature | [° C.] | 120 | 110 | 110 | 120 | 120 | 120 |
| | Processing time | [sec] | 0.2 | 0.2 | 0.012 | 0.2 | 0.2 | 0.2 |
| Taking-up process | Taking-up tensile strength | [cN/dtex] | 0.22 | 0.22 | 0.22 | 0.41 | 0.22 | 0.22 |
| | Taking-up temperature | [° C.] | 25 | 25 | 25 | 25 | 25 | 35 |
| Physical properties of fiber filament | Intrinsic viscosity | [dL/g] | 1.8 | 1.8 | 1.8 | 1.8 | 1.8 | 1.8 |
| | Strength | [cN/dtex] | 15.9 | 15.4 | 15 | 15.6 | 12.1 | 14.1 |
| | Elongation | [%] | 5.9 | 5.7 | 5.5 | 5.2 | 7.1 | 5.9 |
| | Modulus | [cN/dtex] | 610 | 601 | 627 | 612 | 485 | 510 |
| | Specific gravity | [g/cm³] | 0.934 | 0.945 | 0.939 | 0.940 | 0.965 | 0.932 |
| | The number of pores per unit cross-sectional area | [piece/μm²] | 28 | 44 | 64 | 58 | 12 | 7 |
| | Average pore size (diameter) | [nm] | 41 | 45 | 79 | 39 | 15 | 35 |
| | Porosity | [%] | 4.8 | 7.8 | 15.2 | 8.9 | 1.8 | 1.9 |
| | Degree of exhaustion | [%] | 28 | 31 | 32 | 27 | 18 | 19 |
| | Content of organic substance in fiber filament | [% by mass] | 0.5 | 0.7 | 0.8 | 0.5 | 0.4 | 0.8 |
| Storage modulus | Maximum amount of change in storage modulus in a range from −50° C. to 60° C. relative to storage modulus at 20° C. | [%] | 109 | 117 | 113 | 121 | 72 | 65 |
| Crystal dispersion temperature | | [° C.] | 75.0 | 74.8 | 73.2 | 74.2 | 75.1 | 73.8 |
| Crystallinity | | [%] | 83 | 77 | 85 | 82 | 81 | 76 |
| Ratio among crystals | Ratio of monoclinic crystals | [%] | 9 | 6 | 5 | 11 | 23 | 15 |
| | Ratio of orthorhombic crystals | [%] | 74 | 71 | 80 | 71 | 58 | 61 |
| Concentration of residual solvent | | [ppm] | 0 | 0 | 0 | 0 | 0 | 0 |
| Cut-resistance (Index value) | | [—] | 4.0 | 3.9 | 3.7 | 3.9 | 3.9 | 4.1 |
| Retention rate of physical properties | Strength after processing at 60° C. for 30 days | [cN/dtex] | 15.5 | 14.8 | 14.8 | 14.5 | 10.6 | 12.5 |
| | Strength retention rate after processing at 60° C. for 30 days | [%] | 97 | 96 | 99 | 93 | 88 | 89 |
| | Modulus after processing at 60° C. for 30 days | [cN/dtex] | 588.0 | 576.0 | 613 | 565 | 403 | 453 |
| | Modulus retention rate after processing at 60° C. for 30 days | [%] | 96 | 96 | 98 | 92 | 83 | 89 |

TABLE 5

| | | Unit | Production example 23 | Production example 24 | Production example 25 | Production example 26 | Production example 27 | Production example 28 | Production example 29 | Production example 30 | Production example 31 |
|---|---|---|---|---|---|---|---|---|---|---|---|
| Characteristic of raw material | Intrinsic viscosity | [dL/g] | 1.9 | 1.9 | 1.9 | 1.9 | 8.2 | 20 | 0.7 | 1.9 | 1.9 |
| | Mw | [g/mol] | 120,000 | 120,000 | 120,000 | 120,000 | 1,020,000 | 3,300,000 | 42,000 | 120,000 | 120,000 |
| | Mw/Mn | — | 2.7 | 2.7 | 2.7 | 2.7 | 5.2 | 6.3 | 5.1 | 2.7 | 2.7 |
| Spinning method | | | melt spinning | melt spinning | melt spinning | melt spinning | melt spinning | solution spinning | melt spinning | melt spinning | melt spinning |
| Spinning process | Inert gas (nitrogen) supply pressure | [MPa] | 0.005 | 0.005 | 0.005 | 0.005 | 0.005 | — | 0.005 | 0.005 | 0.005 |
| | Melt-extrusion temperature | [° C.] | 280 | 280 | 280 | 280 | 280 | 280 | 230 | 280 | 280 |
| | Nozzle filter mesh diameter | [μm] | 10 | 10 | 10 | 10 | 100 | 200 | 10 | 10 | 10 |
| | Nozzle diameter | [mm] | 0.8 | 0.8 | 0.8 | 0.8 | 0.8 | 0.8 | 0.8 | 0.8 | 0.8 |
| | Nozzle temperature | [° C.] | 280 | 280 | 280 | 280 | 300 | 170 | 230 | 280 | 280 |
| | Single hole discharge rate | [g/min] | 0.4 | 0.4 | 0.4 | 0.4 | Cannot be discharged | 1.0 | 0.4 | 0.4 | 0.4 |
| Drawing process | Spinning speed | [m/min] | 270 | 270 | 270 | 270 | — | 50 | 270 | 270 | 270 |
| | Spinning deformation ratio | [-fold] | 253 | 253 | 253 | 253 | — | 19 | 253 | 253 | 253 |
| | Spinning deformation time | [minute] | 0.8 | 0.8 | 0.8 | 3.3 | — | 0.5 | 0.8 | 0.2 | 0.2 |
| | First step Temperature | [° C.] | 65 | 65 | 65 | 65 | — | 120 | 65 | 65 | 65 |
| | Draw ratio | [-fold] | 2.5 | 2.5 | 2.5 | 2.5 | — | 3.0 | 2.0 | 2.5 | 2.5 |
| | Second step Temperature | [° C.] | 105 | 105 | 105 | 105 | — | 149 | 100 | 105 | 105 |
| | Draw ratio | [-fold] | 4.8 | 4.8 | 4.8 | 4.8 | — | 4.0 | 4.0 | 4.8 | 4.8 |
| | Drawing deformation ratio | [-fold] | 12.0 | 12.0 | 12.0 | 12.0 | — | 12.0 | 8.0 | 12.0 | 12.0 |
| | Drawing deformation time | [minute] | 5.6 | 5.6 | 5.6 | 5.6 | — | 2.2 | 5.6 | 5.2 | 4.8 |
| Heat treatment process | Processing temperature | [° C.] | — | 60 | 120 | 120 | — | — | 120 | 120 | 120 |
| | Processing time | [sec] | — | 0.2 | 0.005 | 0.2 | — | — | 0.2 | 0.2 | 0.2 |
| Taking-up process | Taking-up tensile strength | [cN/dtex] | 0.22 | 0.22 | 0.22 | 0.55 | — | 1.0 | 0.22 | 0.22 | 0.58 |
| | Taking-up temperature | [° C.] | 25 | 25 | 25 | 25 | — | 25 | 25 | 25 | 25 |
| Physical properties of fiber filament | Intrinsic viscosity | [dL/g] | 1.8 | 1.8 | 1.8 | 1.8 | — | 18.0 | 0.6 | 1.8 | 1.8 |
| | Strength | [cN/dtex] | 13.2 | 13.9 | 13 | 13.8 | — | 30.2 | 6.5 | 15.2 | 14.8 |
| | Elongation | [%] | 6.9 | 5 | 5.2 | 5.4 | — | 3.1 | 10.1 | 6.0 | 6.1 |
| | Modulus | [cN/dtex] | 426 | 549 | 556 | 446 | — | 1010 | 212 | 582 | 523 |
| | Specific gravity | [g/cm³] | 0.916 | 0.911 | 0.905 | 0.879 | — | 0.985 | 0.878 | 0.892 | 0.903 |
| | The number of pores per unit cross-sectional area | [piece/μm²] | 18 | 24 | 22 | 22 | — | 0 | 8 | 18 | 17 |

TABLE 5-continued

|  |  | Unit | Production example 23 | Production example 24 | Production example 25 | Production example 26 | Production example 27 | Production example 28 | Production example 29 | Production example 30 | Production example 31 |
|---|---|---|---|---|---|---|---|---|---|---|---|
|  | Average pore size (diameter) | [nm] | 22 | 35 | 30 | 6 | — | — | 8 | 41 | 38 |
|  | Porosity | [%] | 1.1 | 0.9 | 1.0 | 0.6 | — | 0.1 | 0.1 | 1.2 | 3.3 |
|  | Degree of exhaustion | [%] | 16 | 16 | 15 | 14 | — | 14 | 4 | 10 | 21 |
|  | Content of organic substance in fiber filament | [% by mass] | 0.5 | 0.6 | 0.6 | 0.5 | — | 0 | 0 | 0.5 | 0.6 |
| Storage modulus | Maximum amount of change in storage modulus in a range from −50° C. to 60° C. relative to storage modulus at 20° C. | [%] | 33 | 50 | 52 | 135 | — | 92 | 51 | 57 | 58 |
| Crystal dispersion temperature |  | [° C.] | 71.8 | 73.1 | 74.8 | 73.2 | — | 79.5 | 71 | 73.0 | 73.3 |
| Crystallinity |  | [%] | 71 | 69 | 71 | 74 | — | 98 | 58 | 70 | 73 |
| Ratio among crystals | Ratio of monoclinic crystals | [%] | 33 | 32 | 32 | 34 | — | 0.05 | 21 | 32 | 32 |
|  | Ratio of orthorhombic crystals | [%] | 40 | 39 | 41 | 40 | — | 97 | 37 | 38 | 42 |
| Concentration of residual solvent |  | [ppm] | 0 | 0 | 0 | 0 | 0 | 1200 | — | 0 | 0 |
| Cut-resistance (Index value) |  | [—] | 4.2 | 4.1 | 4.1 | 4.3 | — | 6.0 | 2.2 | 4.0 | 3.2 |
| Retention rate of physical properties | Strength after processing at 60° C. for 30 days | [cN/dtex] | 9.1 | 9.6 | 9.7 | 9.8 | — | 29.8 | 4.6 | 10.8 | 9.9 |
|  | Strength retention rate after processing at 60° C. for 30 days | [%] | 69 | 69 | 75 | 71 | — | 99 | 71 | 71 | 67 |
|  | Modulus after processing at 60° C. for 30 days | [cN/dtex] | 288 | 385 | 421 | 329 | — | 989 | 156 | 433 | 358 |
|  | Modulus retention rate after processing at 60° C. for 30 days | [%] | 68 | 70 | 76 | 74 | — | 98 | 74 | 74 | 68 |

TABLE 6

| Color fastness test | | Production example 17 | | Production example 18 | | Production example 19 | | Production example 20 | | Production example 21 | | Production example 22 | |
|---|---|---|---|---|---|---|---|---|---|---|---|---|---|
| Testing method | Kind | Blue | Black | blue | black | blue | black | blue | black | blue | black | blue | black |
| Washing | Change in color (grade) | 4 | 4 | 4 | 4 | 4 | 4 | 4 | 4 | 3 | 3 | 4 | 3 |
| JIS-L-0844 A-1 | Staining in cotton (grade) | 5 | 4 | 5 | 4 | 5 | 4 | 4 | 4 | 3 | 3 | 4 | 4 |
| | Staining in PET (grade) | 5 | 5 | 5 | 5 | 5 | 5 | 4 | 4 | 3 | 3 | 4 | 3 |
| Rubbing | Dry - staining (grade) | 4 | 4 | 4 | 4 | 4 | 4 | 4 | 3 | 3 | 3 | 4 | 3 |
| JIS-L-0849 Type II | Wet - staining (grade) | 5 | 4 | 5 | 4 | 5 | 4 | 4 | 3 | 3 | 3 | 4 | 3 |
| Perspiration (acidic) | Change in color (grade) | 5 | 4 | 4 | 4 | 4 | 4 | 4 | 4 | 3 | 3 | 4 | 3 |
| JIS-L-0848 | Staining in cotton (grade) | 5 | 3 | 4 | 4 | 5 | 3 | 5 | 4 | 3 | 3 | 4 | 4 |
| | Staining in PET (grade) | 5 | 3 | 5 | 3 | 5 | 3 | 5 | 3 | 3 | 3 | 4 | 3 |
| Perspiration (alkaline) | Change in color (grade) | 5 | 3 | 5 | 3 | 5 | 4 | 4 | 3 | 3 | 3 | 4 | 3 |
| JIS-L-0848 | Staining in cotton (grade) | 5 | 3 | 5 | 3 | 5 | 3 | 4 | 3 | 3 | 3 | 4 | 3 |
| | Staining in PET (grade) | 4 | 4 | 4 | 4 | 4 | 4 | 4 | 4 | 3 | 3 | 4 | 4 |
| Dry cleaning | Change in color (grade) | 4 | 3 | 4 | 3 | 4 | 3 | 3 | 3 | 3 | 3 | 3 | 3 |
| (perchlo) | Staining in multiple materials (grade) | 4 | 5 | 4 | 5 | 4 | 4 | 4 | 4 | 3 | 3 | 3 | 4 |
| JIS-L-0860 Method A-1 | | | | | | | | | | | | | |
| Dry cleaning (petroleum) | Change in color (grade) | 5 | 3 | 5 | 3 | 5 | 3 | 4 | 3 | 3 | 3 | 4 | 3 |
| JIS-L-0860 Method B-1 | Staining in multiple materials (grade) | 4 | 5 | 4 | 5 | 4 | 5 | 4 | 4 | 3 | 3 | 3 | 4 |

INDUSTRIAL APPLICABILITY

The highly functional polyethylene fiber according to the present invention exhibits reduction of change in their physical properties in a wide range of temperatures for processing for products and in a wide range of temperatures for usage as products, thereby enabling improvement of dimensional stability. Further, the highly functional polyethylene fiber of the present invention can be dyed, and a color can be freely selected. Products thereof exhibit excellent performance and are widely applicable as protective woven/knitted textiles utilizing cut-resistance that is a characteristic of the fiber, and the fiber itself or the dyed polyethylene fiber exhibit excellent performance and are widely applicable as industrial materials such as tapes, ropes, nets, fishing lines, material protective covers, sheets, kite strings, bowstrings, sail cloths, shelter materials, protective materials, bulletproof materials, sutures for medical use, artificial tendons, artificial muscles, reinforcing materials for use in fiber reinforced plastics, cement-reinforcing materials, reinforcing materials for use in fiber reinforced rubbers, machine tool components, battery separators, and chemical filters.

The invention claimed is:

1. A polyethylene fiber, wherein an intrinsic viscosity [η] is higher than or equal to 0.8 dL/g, and not higher than 2.5 dL/g, as measured in a solvent of decalin at a temperature of 135° C.,
the polyethylene fiber comprises a polyethylene consisting of an ethylene as a repeating unit,
the polyethylene has a weight average molecular weight (Mw) ranging from 50,000 g/mol to 600,000 g/mol,
a maximum thermal shrinkage stress is less than or equal to 0.4 cN/dtex in TMA (thermo-mechanical analysis), and a thermal shrinking percentage at 100° C. is less than or equal to 2.5%,
the polyethylene fiber comprises pores formed in a surface and an inside of the fiber,
the pores have an average diameter ranging from 3 nm to 200 nm, and
the polyethylene fiber has a tensile strength of higher than or equal to 12.1 cN/dtex.

2. The polyethylene fiber according to claim 1, wherein a thermal shrinkage stress at 50° C. is less than or equal to 0.05 cN/dtex, and a thermal shrinkage stress at 80° C. is less than or equal to 0.2 cN/dtex, in the TMA (thermo-mechanical analysis).

3. A polyethylene fiber, wherein
an intrinsic viscosity [η] is higher than or equal to 0.8 dL/g, and not higher than 2.5 dL/g, as measured in a solvent of decalin at a temperature of 135° C.,
the polyethylene fiber comprises a polyethylene consisting of an ethylene as a repeating unit,
the polyethylene has a weight average molecular weight (Mw) ranging from 50,000 g/mol to 600,000 g/mol,
a retention rate, at 105° C., of a storage modulus is such that a storage modulus at 105° C. is higher than or equal to 30% of a storage modulus at 30° C.,
the polyethylene fiber comprises pores formed in a surface and an inside of the fiber,
the pores have an average diameter ranging from 3 nm to 200 nm, and
the polyethylene fiber has a tensile strength of higher than or equal to 12.1 cN/dtex.

4. The polyethylene fiber according to claim 3, wherein
a retention rate, at 80° C., of a storage modulus is such that a storage modulus at 80° C. is higher than or equal to 50% of a storage modulus at 30° C., and
a retention rate, at 50° C., of a storage modulus is such that a storage modulus at 50° C. is higher than or equal to 80% of a storage modulus at 30° C.

5. A polyethylene fiber, wherein
an intrinsic viscosity [η] is higher than or equal to 0.8 dL/g, and not higher than 2.5 dL/g, as measured in a solvent of decalin at a temperature of 135° C.,
the polyethylene fiber comprises a polyethylene consisting of an ethylene as a repeating unit,
the polyethylene has a weight average molecular weight (Mw) ranging from 50,000 g/mol to 600,000 g/mol,
a storage modulus obtained at intervals of 10° C. in a range from −50° C. to 60° C. is higher than or equal to 60% of a storage modulus at 20° C., and is not higher than 130% of the storage modulus at 20° C.,
the polyethylene fiber comprises pores formed in a surface and an inside of the fiber,
the pores have an average diameter ranging from 3 nm to 200 nm, and
the polyethylene fiber has a tensile strength of higher than or equal to 12.1 cN/dtex.

6. A polyethylene fiber, wherein
an intrinsic viscosity [η] is higher than or equal to 0.8 dL/g, and not higher than 2.5 dL/g, as measured in a solvent of decalin at a temperature of 135° C.,
the polyethylene fiber comprises a polyethylene consisting of an ethylene as a repeating unit,
the polyethylene has a weight average molecular weight (Mw) ranging from 50,000 g/mol to 600,000 g/mol,
an amount of monoclinic crystals in the fiber is higher than or equal to 0.5%, and not higher than 30%, of a total amount of monoclinic crystals, orthorhombic crystals, and amorphous components in the fiber,
an amount of orthorhombic crystals in the fiber is higher than or equal to 40%, and not higher than 90%, of a total amount of monoclinic crystals, orthorhombic crystals, and amorphous components in the fiber,
the polyethylene fiber comprises pores formed in a surface and an inside of the fiber,
the pores have an average diameter ranging from 3 nm to 200 nm, and
the polyethylene fiber has a tensile strength of higher than or equal to 12.1 cN/dtex.

7. The polyethylene fiber according to claim 6, wherein the crystallinity for the fiber is higher than or equal to 60%, and not higher than 95%.

8. The polyethylene fiber according to claim 1, wherein a ratio (Mw/Mn) of the weight average molecular weight to a number average molecular weight (Mn) is less than or equal to 5.0.

9. The polyethylene fiber according to claim 1, wherein an initial modulus is higher than or equal to 200 cN/dtex.

10. The polyethylene fiber according to claim 1, wherein a concentration of a residual solvent in the fiber is less than or equal to 1000 ppm.

11. The polyethylene fiber according to claim 1, wherein
the diameter is measured, by each pore being approximated by a column, at a contact angle of 140 degrees, in a mercury intrusion method, and
the pores are formed such that a porosity ranges from 1.5% to 20%.

12. The polyethylene fiber according to claim 1, wherein the polyethylene fiber contains 0.005% to 10.0% by mass of an organic substance having an affinity for both a disperse dye and the polyethylene.

13. The polyethylene fiber according to claim 12, wherein the organic substance having an affinity for both the disperse dye and the polyethylene contains at least one kind of polyether compounds each having a molecular weight greater than or equal to 500.

14. The polyethylene fiber according to claim 1, wherein a degree of exhaustion is greater than or equal to 17%, and the degree of exhaustion is obtained when dyeing is performed at 100° C. at a bath ratio of 1:100 for 90 minutes by using a dye liquor that is prepared to have such a concentration as to contain 0.4 g/L of a disperse dye and 1 g/L of a dyeing aid.

15. A dyed polyethylene fiber that is formed by the polyethylene fiber according to claim 1 being dyed by using a disperse dye.

16. The dyed polyethylene fiber according to claim 15, wherein an evaluation value of a fastness to washing in compliance with JIS L-0844 Method A-1 or/and an evaluation value of a fastness to dry cleaning in compliance with JIS L-0860 Method A-1 is higher than or equal to grade 3.

17. A covered elastic yarn that is formed by an elastic fiber being covered by the polyethylene fiber according to claim 1.

18. A protective woven/knitted textile that is woven/knitted by using, as at least a portion of the protective woven/knitted textile, the polyethylene fiber according to claim 1, wherein an Index value of a coup tester is greater than or equal to 2.5.

19. A cut-resistant glove formed by the protective woven/knitted textile according to claim 18.

20. A method for manufacturing a polyethylene fiber, comprising
performing melt-spinning of a polyethylene in which the polyethylene has an intrinsic viscosity [η] higher than or equal to 0.8 dL/g, and not higher than 2.5 dL/g, as measured in a solvent of decalin at a temperature of 135° C., the polyethylene consists of an ethylene as a repeating unit, and the polyethylene has a weight average molecular weight (Mw) ranging from 50,000 g/mol to 600,000 g/mol,
drawing the polyethylene at a temperature higher than or equal to a crystal dispersion temperature of the polyethylene,
performing, after the drawing step, heat treatment, for a time period longer than or equal to 0.01 seconds, at a temperature higher than the crystal dispersion temperature by at least 10° C., and
performing, after the heat treatment, taking-up at a tensile force less than or equal to 0.5 cN/dtex to form a polyethylene fiber having a maximum thermal shrinkage stress less than or equal to 0.4 cN/dtex in TMA (thermo-mechanical analysis), a thermal shrinking percentage at 100° C. less than or equal to 2.5%, and a tensile strength is higher than or equal to 12.1 cN/dtex,
wherein the polyethylene fiber comprises pores formed in a surface and an inside of the fiber, and the pores have an average diameter ranging from 3 nm to 200 nm.

21. The polyethylene fiber of claim 14, wherein the disperse dye is CI Disperse Red1.

22. The polyethylene fiber of claim 1, wherein the pores have an average diameter greater than or equal to 8 nm and not greater than 150 nm.

23. The polyethylene fiber of claim 1, wherein the polyethylene fiber has a porosity greater than or equal to 1.5% and not greater than 15%.

24. The polyethylene fiber of claim 1, wherein a strength retention rate after processing at 60° C. for 30 days is 88% or more and a modulus retention rate after processing at 60° C. for 30 days is 83% or more.

* * * * *